(12) United States Patent
Erickson et al.

(10) Patent No.: US 11,777,917 B2
(45) Date of Patent: *Oct. 3, 2023

(54) MULTI-PARTY CLOUD AUTHENTICATOR

(71) Applicant: Cisco Technology, Inc., San Jose, CA (US)

(72) Inventors: Jeremy Erickson, Renton, WA (US); Nicholas James Mooney, Seattle, WA (US); Jordan Matthew Wright, San Antonio, TX (US); Nicholas Hamilton Steele, Brooklyn, NY (US); Mikhail Davidov, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/071,869

(22) Filed: Oct. 15, 2020

(65) Prior Publication Data

US 2022/0124078 A1    Apr. 21, 2022

(51) Int. Cl.
*H04L 9/40* (2022.01)
*H04L 9/30* (2006.01)
*H04L 9/08* (2006.01)

(52) U.S. Cl.
CPC .............. *H04L 63/08* (2013.01); *H04L 9/088* (2013.01); *H04L 9/30* (2013.01)

(58) Field of Classification Search
CPC ............ H04L 9/30; H04L 63/08; H04L 9/088
USPC ............................................................ 726/7
See application file for complete search history.

(56) References Cited

U.S. PATENT DOCUMENTS

| | | |
|---|---|---|
| 6,085,321 A | 7/2000 | Gibbs et al. |
| 7,200,752 B2 | 4/2007 | Eskicioglu |
| 8,799,664 B2 | 8/2014 | Gantman et al. |
| 9,064,127 B2 | 6/2015 | O'Hare et al. |
| 9,628,448 B2 | 4/2017 | Hayton |
| 9,871,791 B2 | 1/2018 | Blinn |
| 10,237,070 B2 | 3/2019 | Lindemann |

(Continued)

FOREIGN PATENT DOCUMENTS

| | | |
|---|---|---|
| WO | WO2019034951 A1 | 2/2019 |
| WO | WO2019156081 | 8/2019 |
| WO | WO2021126253 | 6/2021 |

OTHER PUBLICATIONS

Balfanz, Dirk et al. "Web Authentication: An API for accessing Public Key Credentials Level 1" W3C. Mar. 4, 2019. Found onW3C.org (https://www.w3.org/TR/2019/REC-webauthn-1-20190304/) (Year: 2019), 167 pages.

(Continued)

*Primary Examiner* — Benjamin A Kaplan
(74) *Attorney, Agent, or Firm* — Lee & Hayes, P.C.

(57) ABSTRACT

This disclosure describes techniques for authenticating one or more devices of a user in association with cloud computing services. The techniques include generating credential portions. The credential portions may be used in a signing protocol between one of the user devices and a cloud authenticator. The signing protocol may generate a signature that may be used in authentication with a cloud computing service. In some cases, the credential portions may be shared with other devices of the user. As such, the cloud authenticate may assist multiple user devices to authenticate with the cloud computing service.

20 Claims, 14 Drawing Sheets

(56) References Cited

U.S. PATENT DOCUMENTS

| | | |
|---|---|---|
| 10,469,481 B2 | 11/2019 | Mahaffey et al. |
| 10,511,593 B2* | 12/2019 | Appiah ................. G06F 16/951 |
| 10,567,167 B1 | 2/2020 | Ghetti et al. |
| 10,848,469 B1 | 11/2020 | Yarabolu et al. |
| 2014/0359735 A1* | 12/2014 | Lehmann ............ H04L 63/0884 |
| | | 709/227 |
| 2016/0294562 A1 | 10/2016 | Oberheide et al. |
| 2017/0118025 A1* | 4/2017 | Shastri ................ H04L 63/0861 |
| 2018/0101850 A1 | 4/2018 | Pisut, IV et al. |
| 2019/0052631 A1 | 2/2019 | Momchilov et al. |
| 2020/0153640 A1 | 5/2020 | Ranellucci et al. |
| 2020/0353167 A1 | 11/2020 | Vivek et al. |
| 2021/0385216 A1* | 12/2021 | Khalil ................... H04L 9/3239 |
| 2022/0116376 A1* | 4/2022 | Stayskal ................. H04L 63/08 |
| 2022/0123950 A1 | 4/2022 | Erickson et al. |

OTHER PUBLICATIONS

Brand, et al. "Client to Authenticator Protocol (CTAP)" FIDO Alliance. Jan. 30, 2019. Found on FIDOAlliance.org (https://fidoalliance.org/specs/fido-v2.0-ps-20190130/fido-client-to-authenticator-protocol-v2.0-ps-20190130.pdf) (Year: 2019), 87 pages.
Office Action for U.S. Appl. No. 17/071,972, dated Jun. 9, 2022, Erickson, "Multi-Party Cloud Authenticator", 15 pages.

* cited by examiner

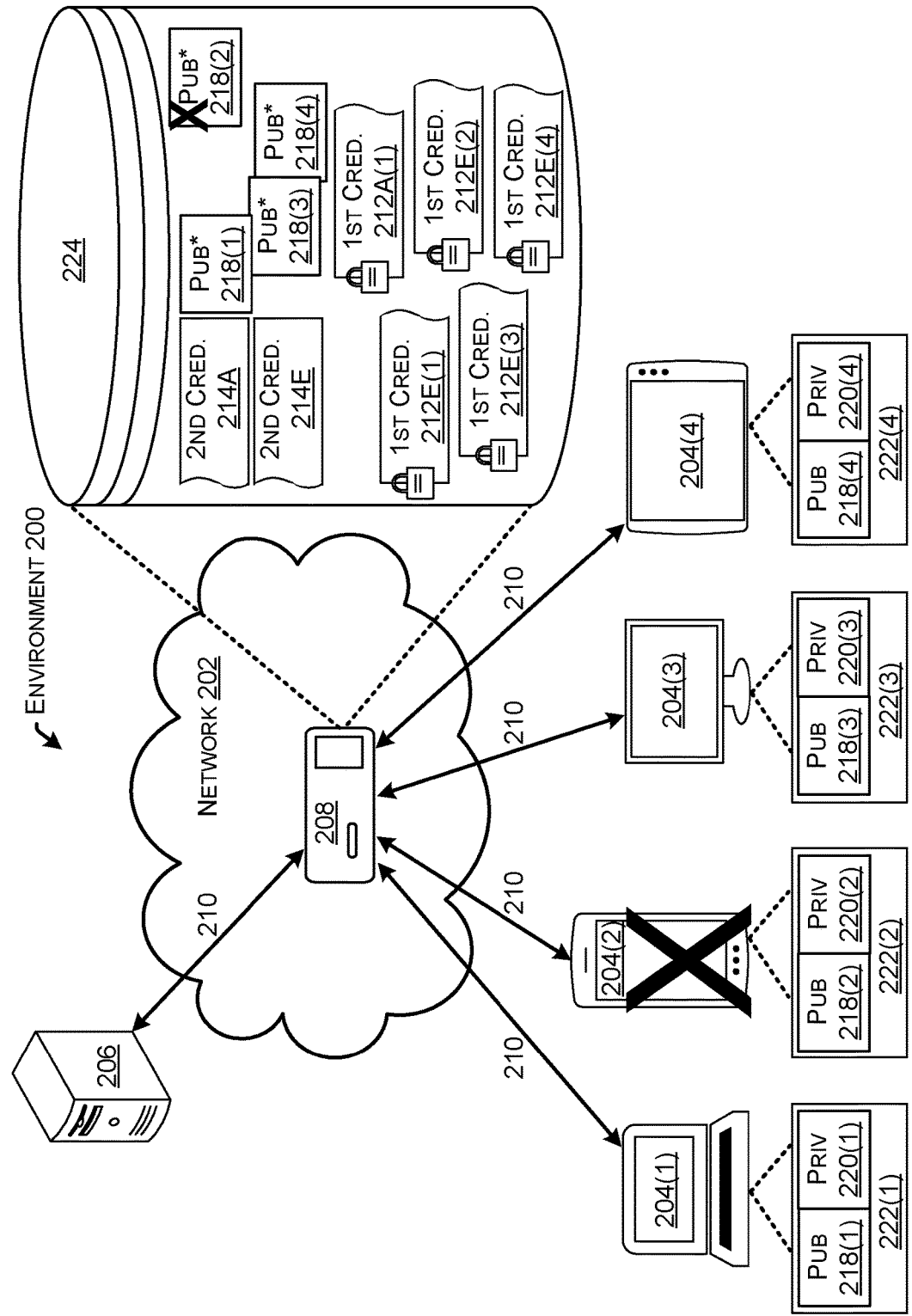

MULTI-PARTY CLOUD AUTHENTICATOR

TECHNICAL FIELD

The present disclosure relates generally to a multi-party cloud authenticator for authenticating one or more devices of a user in association with cloud computing services.

BACKGROUND

Cloud computing offers businesses cost-effective access to virtually unlimited computing power and storage, rather than the businesses purchasing and/or maintaining physical computing resources. As such, many businesses offer services that are performed at distributed and/or remote locations. Since many services include use of private information of a user, such as personal and/or financial information, security is critical for many services offered via cloud computing. However, the distributed nature of cloud computing can increase the complexity of security issues. Therefore, the increasing use of cloud computing by businesses warrants improved methods for customer protection.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
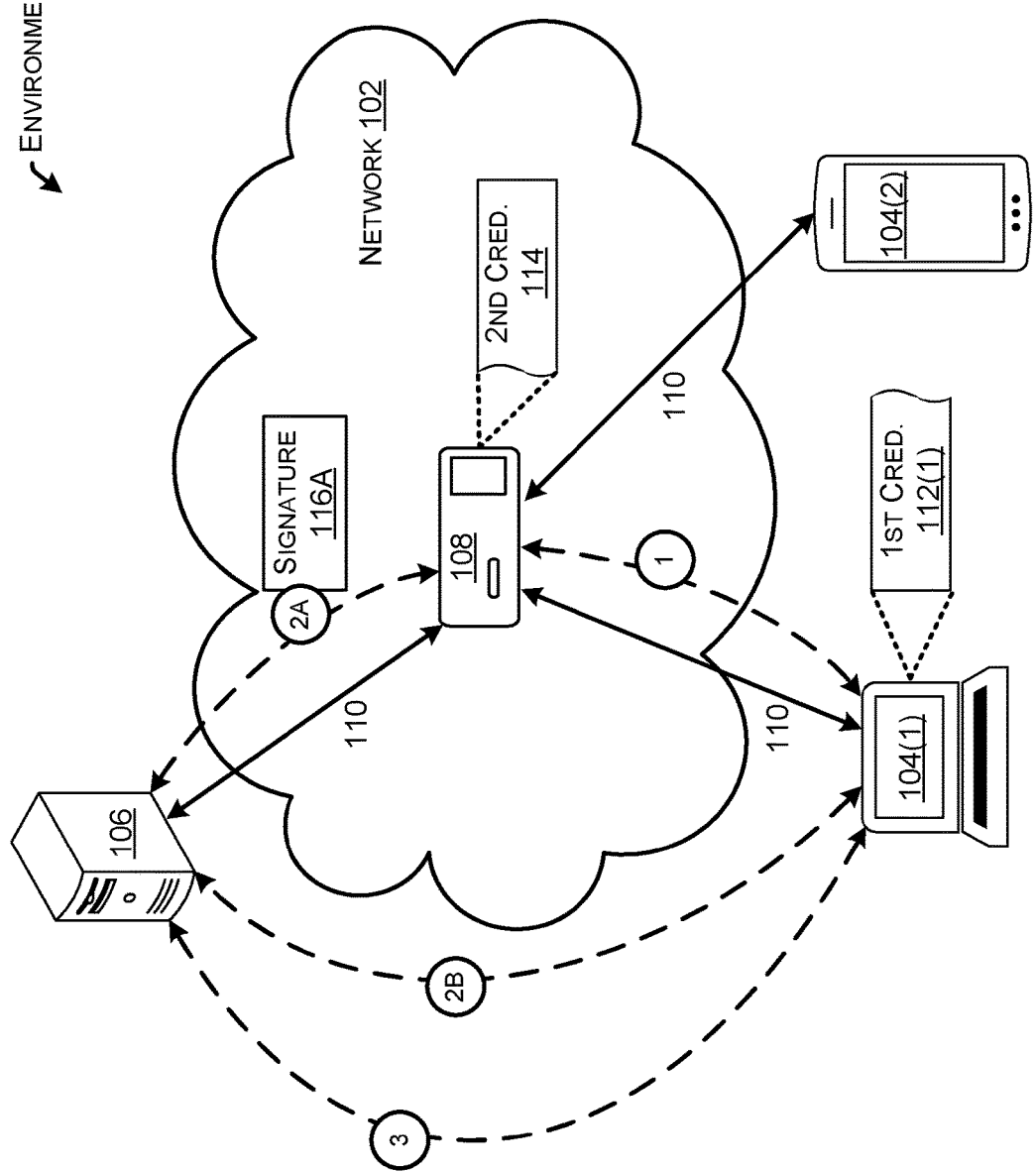
FIGS. 1A-2H illustrate component diagrams with an example environment in which multi-party cloud authentication concepts may be employed, in accordance with the present concepts.

This disclosure describes, at least in part, a method that may be implemented by a user device communicatively coupled to an intermediary device and/or a server device. In some examples, the intermediary device may represent a cloud authenticator. The server device may represent a remote, online service. The method may include registering, by the cloud authenticator, a first user device and a second user device with a user account of a user. The method may include receiving, at the cloud authenticator and from the first user device, a first request to authenticate the user account to the online service. The method may also include initiating generation of a first credential portion and a second credential portion for authenticating the user account with the online service. In some cases, the first credential portion may be retained by the first user device and the second credential portion may be retained by the cloud authenticator. Also, the method may include generating a first signature by participating in a first signing protocol between the cloud authenticator and the first user device. Throughout the signing protocol, the first credential portion may be retained by the first user device and the second credential portion may be retained by the cloud authenticator. The method may include sending, by the cloud authenticator, the first signature to a remote device associated with the online service to authenticate the user account to the online service. In some examples, the method may include passing an encrypted copy of the first credential portion from the first user device to the second user device. The method may include receiving, at the cloud authenticator and from the second user device, a second request to authenticate the user account to the online service. Further, the method may include generating a second signature by participating in a second signing protocol between the cloud authenticator and the second user device. During the second signing protocol, the first credential portion may be retained by the second user device and the second credential portion may be retained by the cloud authenticator.

This disclosure also describes, at least in part, a method that may be implemented by a user device communicatively coupled to intermediary device and/or a server device. In some examples, the intermediary device may represent a cloud authenticator, while the server device may represent a remote, online service. The method may include sending, by a first user device and to a cloud authenticator, a first request to access an online service. The first user device may be associated with a user account at the cloud authenticator, for instance. The method may include participating in generation of a first credential portion and a second credential portion for authenticating the user account with the online service. The first credential portion may be retained by the first user device and the second credential portion may be retained by the cloud authenticator. The method may also include participating in a signing protocol with the cloud authenticator. In the signing protocol, the first credential portion may be retained by the first user device and the second credential portion may be retained by the cloud authenticator. In some examples, the signing protocol may generate a signature for authenticating to the online service. In response to completing the first signing protocol, the method may include accessing the online service by the first user device. The method may also include encrypting, by the first user device, a copy of the first credential portion. The encryption may be performed using a public key of a second user device associated with the user account. Further, the method may include passing the encrypted copy of the first credential portion to the second user device.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for a cloud authenticator. A cloud authenticator may provide an interface through which a user may log in to an online service. The cloud authenticator may help the online service trust a user device of the user to allow access to the online service through the use of a credential associated with the user. Also, the user may have multiple user devices from which the user would like to log in to the online service. In some implementations, the cloud authenticator may enable the user to use any one of the multiple user devices to register and/or log in to an online service after enrolling only a single user device with the online service, providing convenience for the user. Furthermore, in some implementations, the cloud authenticator may not be able to use the credential of the user without the cooperation of at least one of the user devices under control of the user, providing security for the user. Thus, the present techniques offer a relatively convenient and safe system for a user to log in to online services.

Cloud authentication systems may be replacing passwords as a preferred authentication mechanism for online services, and possibly other entities. Online services may include websites and/or another form of Relying Party (RP), which may rely on some form of authentication of a user in order to allow the user to access the online service. However, some logistical challenges remain in the way of more widescale adoption of cloud authentication systems for account log in. One of the issues with cloud authentication systems is account recovery, for which a current recommendation is to enroll multiple authenticators. Users may wish to enroll multiple authenticators, as the user may wish to use different user devices (with different attached authenticators) to access various online services. However, under the current model, users may need to enroll each of their "N" authenticators (e.g., user devices) with each of "M" online services (e.g., websites), for a total of "N*M" enrollments. Thus, the amount of enrollments may easily grow to an unacceptable user burden for common amounts of M (100+ RPs) that a user engages in modern life. Additionally, in the enterprise space, an administrator may wish to create a role and then designate a number of users (or a subset of user devices of the users) as eligible authenticators for that role. In this case, the amount of associated enrollments could easily become burdensome for the administrator.

A naïve cloud authenticator may work by storing a credential of a user, then allowing each user device of the user to authenticate to the cloud authenticator. In turn, the cloud authenticator could authenticate to any given website on behalf of the user device, using the credential of the user. Such a scheme may free the user from the burden of having to repeatedly, manually log in and/or register from any of multiple user devices with user names, passwords, etc. However, unfortunately the naïve cloud authenticator scheme presents a danger to the user. Since the naïve cloud authenticator is outside the control of the user, and stores a raw credential of the user, the naïve cloud authenticator is therefore capable of logging in to a website and/or an account of the user without permission from the user. The present concepts provide a cloud authenticator that solves the potentially burdensome "N*M" (number of enrollments) problem, but also ensures that cryptographically the cloud authenticator cannot log in to an account of the user without consent and/or cooperation of the user.

In some implementations, a cloud authenticator may provide an interface via which a user device of a user may hold a first credential portion of a credential associated with the user and the cloud authenticator may hold a second credential portion of the credential associated with the user. The first credential portion and the second credential portion may be complimentary, such that together the portions may be used to authenticate to the online service. Throughout a login process for a website, the first credential portion may be retained by the user device of the user. Additionally or alternatively, the second credential portion may be retained by the cloud authenticator. Generation of the first and second credential portions may be accomplished such that none of the user device(s), the cloud authenticator, or any other device ever has possession of the complete credential. When each credential portion is retained separately by the user device and the cloud authenticator, neither the user device nor the cloud authenticator is able to log into an online service without the cooperation of the other entity. No single actor may complete the credential and/or take authentication action unilaterally, for example. Such a cloud authentication system offers improved security for a user since the cloud authenticator may not log in to a user account without permission from the user. Permission may be provided by confirming a biometric of the user, for example. Furthermore, in an instance where a user device is stolen, the user device may not be used to log in to the user account without permission from the user.

Taken one step further, the cloud authentication system may be designed such that any of multiple user devices of the user may hold (or have access to) the first credential portion. Therefore, in a first instance, a user may be allowed to log in to an online service where a mobile phone (under control of the user) provides the first credential portion and the second credential portion is provided by the cloud authenticator. Additionally, the same user may be allowed to log in to the online service in a second instance, where a desktop computer (under control of the user) provides the first credential portion to be used with the second credential portion held by the cloud authenticator. Such a scheme may be referred to as a multi-party cloud authentication system, where multiple parties (e.g., the user devices and the cloud authenticator) are using "shares" (e.g., portions) of a credential associated with the user. Stated another way, a multi-party cloud authentication system may use any of several devices of a user to cooperate with a cloud authenticator to access an online service in a convenient and safe manner.

One example way to implement a first credential portion and a second credential portion in a multi-party cloud authentication system is through the use of a threshold signature. With a threshold signature (e.g., threshold signature algorithm), a private key is not held by a single entity, but instead is spread across multiple entities. Threshold signatures allow two (or more) entities to use keyshares (e.g., credential portions) to form a signature, without reconstructing a complete credential. To generate a signature, the entities (or at least some subset of the entities) among which the credential portions are distributed must cooperate to generate the signature. Therefore, a cloud authenticator using a threshold signature algorithm may form a signature to log in to a user account with the cooperation of at least one user device that is under control of the user. In some implementations, the signature may be used for an authentication procedure with an online account, such as WebAuthn. The signature formed with the threshold signature algorithm may be used to sign an assertion, registration, log on statement, etc., to log on to a website, for example. In some cases, the cooperation to form the signature may be referred to as a signing protocol. The resultant signature and/or signed assertion may be verified by any entity with a public key that coordinates with the private key. For example, the online service that the user is attempting to access may hold the coordinating public key. The online service may be able to use the public key to verify the signature created with the threshold signature algorithm.

To summarize, by sharing critical elements of an authentication procedure, the multi-party cloud authentication system allows a user to easily register and use multiple user devices, yet is resilient to loss or theft of any individual user device. The multi-party cloud authentication system may also be applied to the sharing of enterprise "roles" across multiple users. In an enterprise system, the multi-party cloud authentication system may allow an administrator to easily and safely provision and recover accounts, and other important features for enterprise workforces. As such, the multi-party cloud authentication system offers an improved interface through which users may access an online service and/or administrators may manage an enterprise workforce.

Although the examples described herein may refer to a user device and/or an intermediary device as participating in a multi-party cloud authentication system in a cloud networking environment, the techniques can generally be applied to any device or role, including an enterprise workforce scenario. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
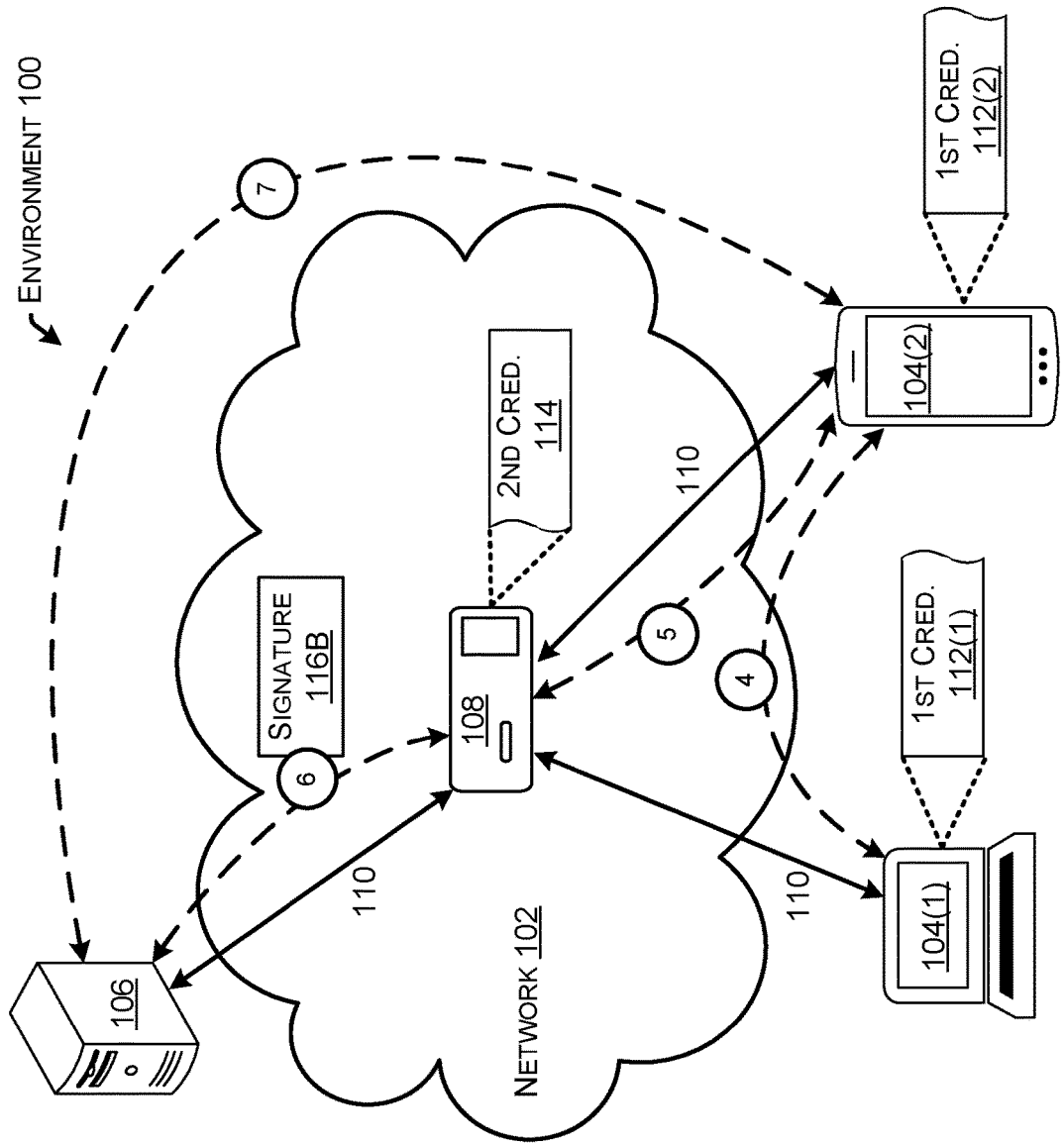

FIGS. 1A and 1B collectively illustrate an example environment 100 in accordance with the present multi-party cloud authentication concepts. Example environment 100 may include a cloud computing network 102 (e.g., network), one or more user devices 104, one or more server devices 106 (e.g., remote devices), and/or one or more intermediary devices 108 (e.g., cloud computing devices). Parentheticals are utilized after a reference number to distinguish like elements. Use of the reference number without the associated parenthetical is generic to the element. For example, FIGS. 1A and 1B include two instances of a user device 104, including user device 104(1) which may represent a mobile phone, and user device 104(2) which may represent a desktop computer. In some scenarios, multiple user devices 104 may be associated with a single user, and may be viewed as being under the control of the user. The server device 106 may provide a remote, online service that the user wishes to engage via at least one of the user devices 104. Additionally or alternatively, the intermediary device 108 may represent a cloud authenticator that may provide a service of assisting user devices 104 with authenticating to server device 106. In some implementations, the user associated with user devices 104 may have a user account with the cloud authenticator represented by intermediary device 108, for instance. In this case, user device 104(1) and user device 104(2) may be trusted (e.g., known) by the cloud authenticator as being associated with the user account. Additional detail regarding the enrollment of, and building trust in, multiple user devices with a user account at a cloud authenticator will be provided below, relative to FIGS. 2A-2H.

The user devices 104, server devices 106, and/or intermediary devices 108 may be communicatively coupled among one another and/or to various other devices via network 102. Within the example environment 100, a user device 104, server device 106, intermediary device 108, and/or other devices may exchange communications (e.g., packets) via a network connection(s) to network 102, indicated by double arrows 110. For instance, network connections 110 may be transport control protocol (TCP) network connections or any network connection (e.g., information-centric networking (ICN)) that enable the devices to exchange packets with other devices via cloud computing network 102. The network connections 110 represent, for example, a data path between a user device 104 and an intermediary device 106. For example, the user device 104 may be a computer, laptop, mobile device, tablet, etc., while the server device 106 and/or the intermediary device 108 may be a network device 106 that is configured to provide data and/or network services to the user device 104. The server device 106 and/or intermediary device 108 may or may not be a producer, a point of generation and/or origination of the data. For instance, the data may originate elsewhere for the server device 106 and/or the intermediary device 108 to be able to provide to the user device 104. Alternatively or additionally, the data may pass through other network devices (e.g., router, switch) on a path from the server device 106 and/or the intermediary device 108 to the user device 104. It should be appreciated that the term "network connection" may also be referred to as a "network path." The use of a cloud computing network in this example is not meant to be limiting. Other types of networks are contemplated in accordance with multi-party cloud authentication concepts.

FIGS. 1A and 1B show several examples of communications among user devices 104, server device 106, and intermediary device 108. The communications are indicated with dashed, numbered lines. In some implementations, the communications may be part of a multi-party cloud authentication scenario for the intermediary device 108 to assist a user device 104 to authenticate with an online service offered via server device 106. For example, in FIG. 1A at "Step 1," user device 104(1) may communicate with intermediary device 108. User device 104(1) may be registered under a user account of the user at the cloud authenticator such that intermediary device 108 recognizes user device 104(1) as associated with the user account. The communication at Step 1 may correspond to an initial enrollment with the online service. In this case, the user may wish to enroll with the online service at server device 106 via the cloud authenticator at intermediary device 108 such that the user may use any of his/her user devices 104 to access the online service without having to enroll each of the user devices 104 with the online service. Step 1 may include generation of a first credential portion 112 and a second credential portion 114 that may be used to authenticate to the online service. Additional detail regarding the generation of credential portions will be provided below, relative to FIGS. 2A-2H.

As shown in FIG. 1A, user device 104(1) may hold (e.g., retain, have access to, etc.) first credential portion 112(1) (e.g., a client key). The intermediary device 108 may hold second credential portion 114 (e.g., cloud key). In this example, the first credential portion 112 and the second credential portion 114 may be viewed as complimentary, such that the first credential portion 112 and the second credential portion 114 together comprise a complete credential. As such, the first credential portion 112 and the second credential portion 114 may both be needed to generate a signature for authentication purposes.

Following generation of the first credential portion 112 and the second credential portion 114, the communication at Step 1 may include a signing protocol between user device 104(1) and intermediary device 108. The signing protocol may include several messages that are sent between user device 104(1) and intermediary device 108. For instance, an algorithm may be used that constitutes several back-and-forth messages which generate a signature. In some examples, the algorithm may be a threshold signature algorithm. The signing protocol may be performed using the first credential portion 112(1) held by user device 104(1) and the second credential portion 114 held by intermediary device 108. However, the user device 104(1) may retain the first credential portion 112(1) and the intermediary device 108 may retain the second credential portion 114 throughout the signing protocol. Stated another way, intermediary device 108 may participate in the signing protocol without ever knowing and/or having access to plain text of the first credential portion 112. As such, the first credential portion 112 is kept "secret" from the cloud authenticator. Similarly, user device 104(1) does not have access to the second credential portion 114. Through the communication in Step 1, a signature 116A may be generated. The signature 116A may be associated with an assertion, such as an assertion related to a log on and/or other authentication action regarding the online service represented by server device 106.

At "Step 2A" of FIG. 1A, intermediary device 108 may send or otherwise provide signature 116A to server device 106. Server device 106 may review signature 116A to determine whether the associated assertion may be trusted. For example, the server device 106 may hold a public key, and inspection of signature 116A by server device 106 may include comparing and/or matching the public key to a private key associated with a corresponding online account of the user at the online service. In this manner, the user account at the cloud authenticator may be authenticated to the online account at the online service. Note that the online service may or may not be aware of any user device 104. In some implementations, the cloud authenticator may be registering the user account and/or logging in to the online service on behalf of the user, such that the online service is aware of the cloud authenticator, but not necessarily a user device 104. Conversely, in some implementations, the online service may or may not be aware of any intermediate device 108 and/or the cloud authenticator. For example, the online service may only "see" one or more of the user devices 104 throughout the registration, authentication, and/or log in processes. Various communication flows are contemplated for the delivery of a signature 116 to the online service. For example, "Step 2B" is shown in FIG. 1A as an alternate version, where signature 116A may be sent to server device 106 from user device 104(1). For instance, user device 104(1) may act as a proxy for the cloud authenticator in completing an authorization process with the online service.

At "Step 3" of FIG. 1A, upon determining that signature 116A is valid and/or that access to the user account has otherwise been authenticated, server device 106 may provide the online service associated with the user account. Note that after authentication, the cloud authenticator may or may not continue to be involved as an intermediary in the interaction represented by Step 3. Server device 106 may provide the online service to the user at user device 104(1) directly, or indirectly via intermediary device 108. Furthermore, once the user has been authenticated in a user session via a user device 104 (e.g., user device 104(1)), the user may actually access the online service in the user session through a different user device 104, such as user device 104(2).

The multi-party cloud authentication scenario may continue in FIG. 1B. In some implementations, "Step 4" may represent user device 104(1) directly passing a copy of the first credential portion 112(2) to user device 104(2). The cloud authenticator may assist or facilitate sharing the copy of the first credential portion 112(2) to the user device 104(2), such as by prompting user device 104(1) to send the first credential portion 112(2) to user device 104(2). In other implementations, the copy of the first credential portion 112(2) may be passed to the user device 104(2) via the cloud authenticator. For instance, intermediary device 108 may receive and/or have access to an encrypted (e.g., blind, secret, masked) copy of the first credential portion 112. In some examples, intermediary device 108 may have received the encrypted first credential portion 112 duration generation of the first credential portion 112 and the second credential portion 114. Additionally or alternatively, intermediary device 108 may have received the encrypted first credential portion 112 from user device 104(1) at some point after generation of the first and second credential portions 112 and 114. Distribution of copies of first credential portion 112 may be part of a synching process among user devices 104 and/or the cloud authenticator at intermediary device 108, for instance. The encrypted first credential portion 112 may be sent to the cloud authenticator by a user device 104 for the purpose of sharing with other user devices 104 associated with the user account. Also, the encrypted first credential portion 112 may be sent to the cloud authenticator for other purposes, such as for storing the encrypted first credential portion 112 in case a user device 104 is lost, stolen, or damaged. As such, the cloud authenticator may hold the encrypted first credential portion 112 without having knowledge of and/or access to a plain text version of the first credential portion 112, and the cloud authenticator may not use the first credential portion 112 to authenticate the user account to a third party without permission from the user. Step 4 of FIG. 1B may represent the cloud authenticator passing the copy of the first credential portion 112(2) to user device 104(2) from intermediary device 108. Therefore, as a result of Step 4, user device 104(2) may hold the first credential portion 112(2) which is associated with the online service offered via server device 106, without the user having had to enroll user device 104(2) with the online service. Additional detail regarding the sharing of encrypted copies of credential portions will be provided below, relative to FIGS. 2A-2H.

Continuing the multi-party cloud authentication scenario, in another instance the user may wish to access the online service provided via server device 106, but this time the user would like to access the online service via user device 104(2). Therefore, at "Step 5," user device 104(2) may communicate with intermediary device 108 to initiate a signing protocol. The signing protocol may be performed using the first credential portion 112(2) held by user device 104(2) and the second credential portion 114. Similar to Step 1 of FIG. 1A, the result of the communication in Step 5 of FIG. 1B may be a signature 116B, which may be associated with an assertion related to authenticating the user account at the cloud authenticator to the online service at server device 106.

At "Step 6" of FIG. 1B, intermediary device 108 may send or otherwise provide signature 116B to server device 106. Note that similar to Step 2B of FIG. 1A, in some examples user device 104(2) may send signature 116B to server device 106. As described above, user device 104(2) may act as a proxy for the cloud authenticator during authentication. Server device 106 may review signature 116B to determine whether authentication of the user account with the online account at the online service may proceed. In this manner, the user account at the cloud authenticator may be authenticated to the online account at the online service. At "Step 7," upon determining that signature 116B is valid, server device 106 may provide the online service associated with the user account. Note that in the examples shown through FIGS. 1A and 1B, the multi-party cloud authentication system was able to perform authentication services for multiple user devices 104 without the online service having to subscribe to and/or download any particular software and/or application of the cloud authenticator. The online service could review signature 116A and/or signature 116B without any particular accommodation related to the user device 104 enrollment scheme with the user account at the cloud authenticator or for the credential generation process between the user devices 104 and the cloud authenticator, for instance.

In summary, in the multi-party cloud authentication scenario illustrated through FIGS. 1A and 1B, intermediary device 108 provided a multi-party cloud authentication service to a user associated with user devices 104(1) and 104(2), allowing the user to sign in to an online service offered via server device 106. The user was able to use multiple user devices 104 to access the online service in different instances, without having to enroll each user device 104 that was used with the online service. Authentication with the online service was accomplished without the online service having to make any special accommodation for the cloud authenticator. Further, control of the first credential portion 112 associated with the user was retained at the user devices 104 throughout the scenario, such that the cloud authenticator represented by intermediary device 108 did not have control and/or unilateral use of a complete credential (e.g., private key) associated with the user.

Note that the depiction of a single server device 106 (e.g., remote device) and/or a single intermediary device 108 (e.g., cloud computing device) in FIGS. 1A and/or 1B is not meant to be limiting. The online service may be provided by multiple server devices 106, and the multi-party authentication may be provided via multiple intermediary devices 108, either in the same or different sign-on instances. For instance, multi-party authentication may be provided through multiple intermediary devices 108, such that user devices 104(1) and 104(2) may be communicating with different physical intermediary devices 108 at different times.

FIGS. 2A-2H collectively illustrate an additional example multi-party cloud authentication scenario in accordance with the present concepts. FIGS. 2A-2H illustrate an example environment 200. Some aspects of the examples shown in FIGS. 2A-2H may be similar to aspects of the examples described above relative to FIGS. 1A and 1B. Therefore, for sake of brevity, not all elements of FIGS. 2A-2H will be described in detail. Parentheticals are utilized after a reference number to distinguish like elements. Use of the reference number without the associated parenthetical is generic to the element. It should be appreciated that various example Steps are described relative to FIGS. 2A-2H for the purpose of illustrating multi-party cloud authentication concepts. As such, more or fewer Steps might be performed than shown in the FIGS. 2A-2H and described herein. The Steps may also be performed in a different order than those described herein.

Example environment 200 may include a cloud computing network 202 (e.g., network), one or more user devices 204, one or more server devices 206 (e.g., remote devices), and/or one or more intermediary devices 208 (e.g., cloud computing devices). The depiction of a single server device 206 and/or a single intermediary device 208 in FIGS. 2A-2H is not meant to be limiting. The user devices 204, server devices 206, and/or intermediary devices 208 may be communicatively coupled among one another and/or to various other devices via network 202. A user device 204, server device 206, intermediary device 208, and/or other devices may exchange communications (e.g., packets) via a network connection(s) to network 202, indicated by double arrows 210.

The example multi-party cloud authentication scenario illustrated in FIGS. 2A-2H may include one or more first credential portions 212, second credential portions 214, and/or signatures 216, similar to concepts described above relative to FIGS. 1A and 1B. Additionally, the example multi-party cloud authentication scenario illustrated in FIGS. 2A-2H may include one or more public keys 218 and/or private keys 220. In some examples, each user device 204 may have a (potentially unique) keypair, including a public key 218 and a private key 220. The keypair may enable identification of the respective user device 204, for instance. The keypairs may be held in storage 222 on the user devices 204. For example, user device 204(1) is holding a keypair, including public key 218(1) and private key 220(1) in storage 222(1). Similarly, user device 204(2) is holding a keypair, including public key 218(2) and private key 220(2) in storage 222(2). Differences in the keypairs at user device 204(1) and user device 204(2) may allow identification of the respective user devices 204, differentiation of messages received from those user devices 204, and/or assertions signed using those keypairs, for instance. In some implementations, storage 222 may be a form of secure storage, such as a hardware security module (HSM).

Figure 2A:
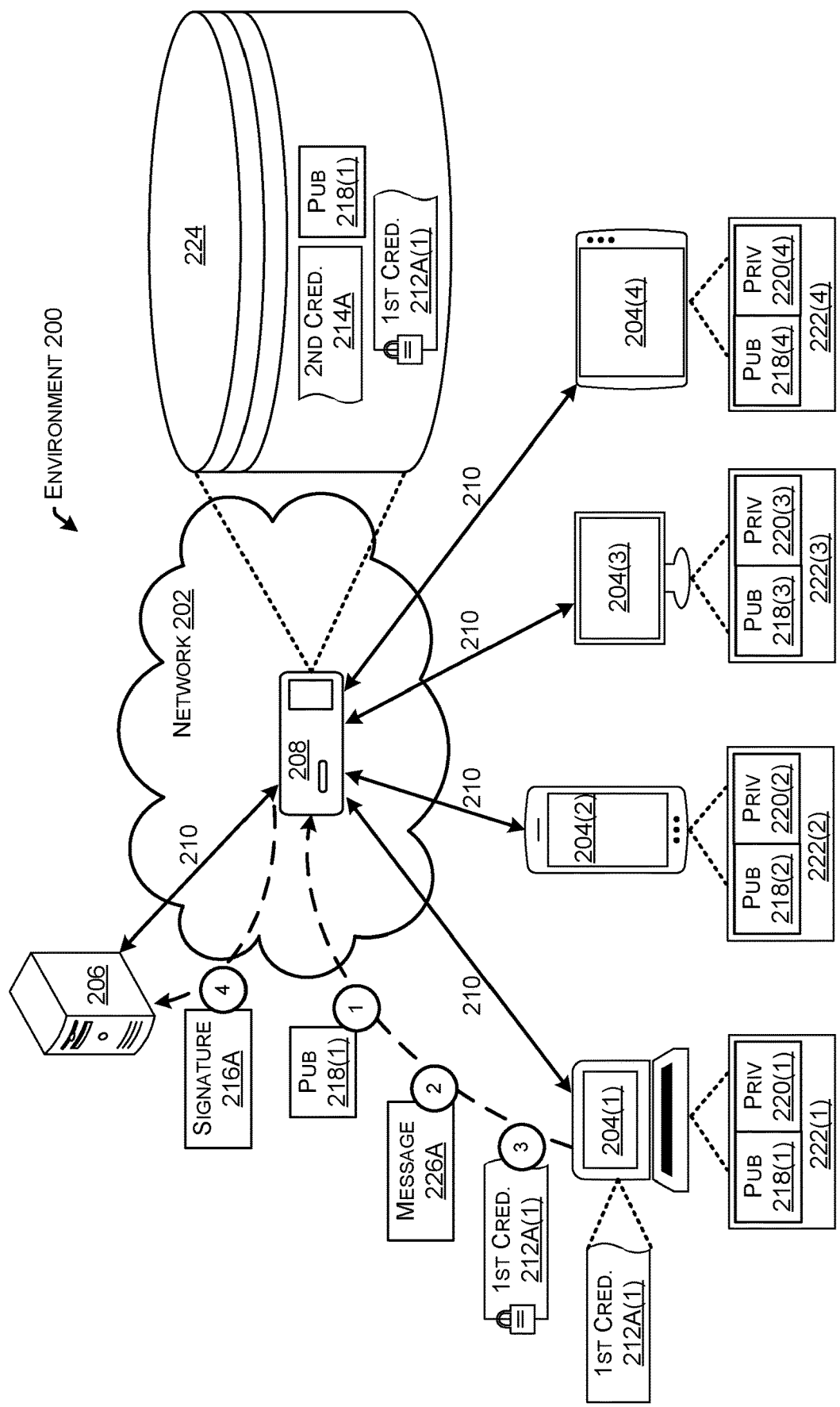

Beginning with FIG. 2A, the example multi-party cloud authentication scenario includes communications among user devices 204, server device 206, and intermediary device 208, indicated with dashed, numbered lines. In some implementations, the communications may be part of a multi-party cloud authentication scenario for a user to register and/or set up multiple user devices 204 with a user account at a cloud authenticator represented by intermediary device 208. The example multi-party cloud authentication scenario may begin with a user device 204(1) enrolling with the user account at the cloud authenticator and/or establishing a new user account at the cloud authenticator, as described below.

At "Step 1" of FIG. 2A, user device 204(1) may communicate with intermediary device 208. User device 204(1) may send public key 218(1) to the intermediary device 208. Intermediary device 208 may associate the public key 218(1) with the user device 204(1) and/or with the user account. Intermediary device 208 may also hold the public key 218(1) in storage 224. In some cases, storage 224 may represent cloud storage for the cloud authenticator. Since the cloud authenticator now has access to public key 218(1), the cloud authenticator will be able to verify future messages received from user device 204(1) that are signed with the corresponding private key 220(1) of the keypair. As such, Step 1 of FIG. 2A may represent a "trust on first use" type arrangement.

At "Step 2" of FIG. 2A, user device 204(1) may send a message 226A to the cloud authenticator. The message 226A may be any of a variety of communications regarding the user account, such as signing into the user account. The message 226A may be signed with the private key 220(1), and therefore the cloud authenticator may trust that the message 226A is coming from user device 204(1) and that user device 204(1) is under control of the user. Note that for some elements, a reference letter may be used to distinguish different instances of an element introduced in different FIGS. of the example multi-party cloud authentication scenario. For example, the "A" in message 226A corresponds to FIG. 2A, while a different message 226B appears in FIG. 2B. Also, Step 2 and message 226A are provided for illustration purposes. The occurrence of Step 2 is not necessary to proceed to Step 3 in this scenario, for instance.

At "Step 3" of FIG. 2A, the user may wish to enroll the user account with an online service at server device 206 via the cloud authenticator. Further, the user may wish to enroll with the online service via the cloud authenticator in such a manner that the user may use any of his/her user devices 204 to access the online service, without having to individually, manually enroll each of the user devices 204. Step 3 may include generation of a first credential portion 212A(1) and a corresponding second credential portion 214A that may be used to authenticate the user account to the online service. In general, generation of a first credential portion 212 and a corresponding second credential portion 214 may be performed in a distributed manner between a user device 204 and the cloud authenticator, for example. The credential generation may require agreement from both the user device 204 and the cloud authenticator to participate, such that neither is able to complete the generation process without cooperation from the other entity. In some implementations, the generation process may be a function provided by a threshold signature algorithm. The generation process may include multiple rounds of message trading between the user device 204 and the cloud authenticator, for instance. In some implementations, the generation process may be viewed as "trustless," such that neither the user device 204 nor the cloud authenticator controls the generation process. In one example, code that enables participation in the credential generation process may be loaded on a user device 204, such as via an application associated with the cloud authenticator.

As shown in FIG. 2A, user device 204(1) may hold first credential portion 212A(1), and the intermediary device 208 may hold second credential portion 214A in storage 224, for example. The first credential portion 212A(1) and second credential portion 214A may be used in a signing protocol between user device 204(1) and intermediary device 208. The signing protocol may also include use of a threshold signature algorithm, for instance. The signing protocol may generate a signature 216A. Therefore, Step 3 of FIG. 2A may include the generation of the first credential portion 212A(1) and the corresponding second credential portion 214A and also generation of signature 216A. Throughout the signing protocol, the user device 204(1) may retain the first credential portion 212A(1) and the intermediary device 208 may retain the second credential portion 214A such that the intermediary device 208 does not know and/or have access to plain text of the first credential portion 212A(1). As such, the first credential portion 212A(1) is kept "secret" from the cloud authenticator. Similarly, user device 204(1) does not have access to the second credential portion 214A. However, also in Step 3, where enrollment of another user device 204 (described below relative to FIG. 2B) has already been completed, an encrypted copy of the first credential portion 212A(1) may be passed to intermediary device 208 to be held in storage 224 in association with the user account. (In FIGS. 2A-2H, encrypted copies of first credential portions 212 are shown with a lock symbol.) Note that the encrypted copy of the first credential portion 212A(1) in storage 224 remains secret from intermediary device 208 and/or the cloud authenticator, such that a plain text version of first credential portion 212A(1) is not available to the cloud authenticator. As such, the cloud authenticator may not use any version or copy of first credential portion 212A without permission from a user device 204 under control of the user. In some cases, first credential portion 212A(1) may be stored with the cloud authenticator for backup purposes, in case the user device 204(1) is lost, damaged, replaced, etc.

At "Step 4" of FIG. 2A, the cloud authenticator may use the signature 216A that was generated in Step 3 to authenticate the user account with the online service. Note that user device 204(1) may actually send the signature 216A to server device 206, acting as a proxy for intermediary device 208, for instance. Server device 206 may review signature 216A to determine whether an associated assertion may be trusted. For example, the server device 206 may use key-pairs associated with a corresponding, already-registered online account of the user at the online service to analyze and/or compare with the signature 216A. Once again, the online service may or may not be aware of any individual user device 204 and/or intermediary device 208. In some implementations, the cloud authenticator may have registered the user account and/or may be logging in to the online service on behalf of the user, such that the online service is aware of the cloud authenticator, but not necessarily a particular user device 204. Or conversely, the user device 204 may be communicating with the server device and acting as a proxy for cloud authenticator throughout the authentication process. Upon determining that signature 216A is valid and/or that access to the user account has otherwise been authenticated, server device 206 may provide the online service associated with the user account to user device 204(1), either directly or indirectly.

Figure 2B:
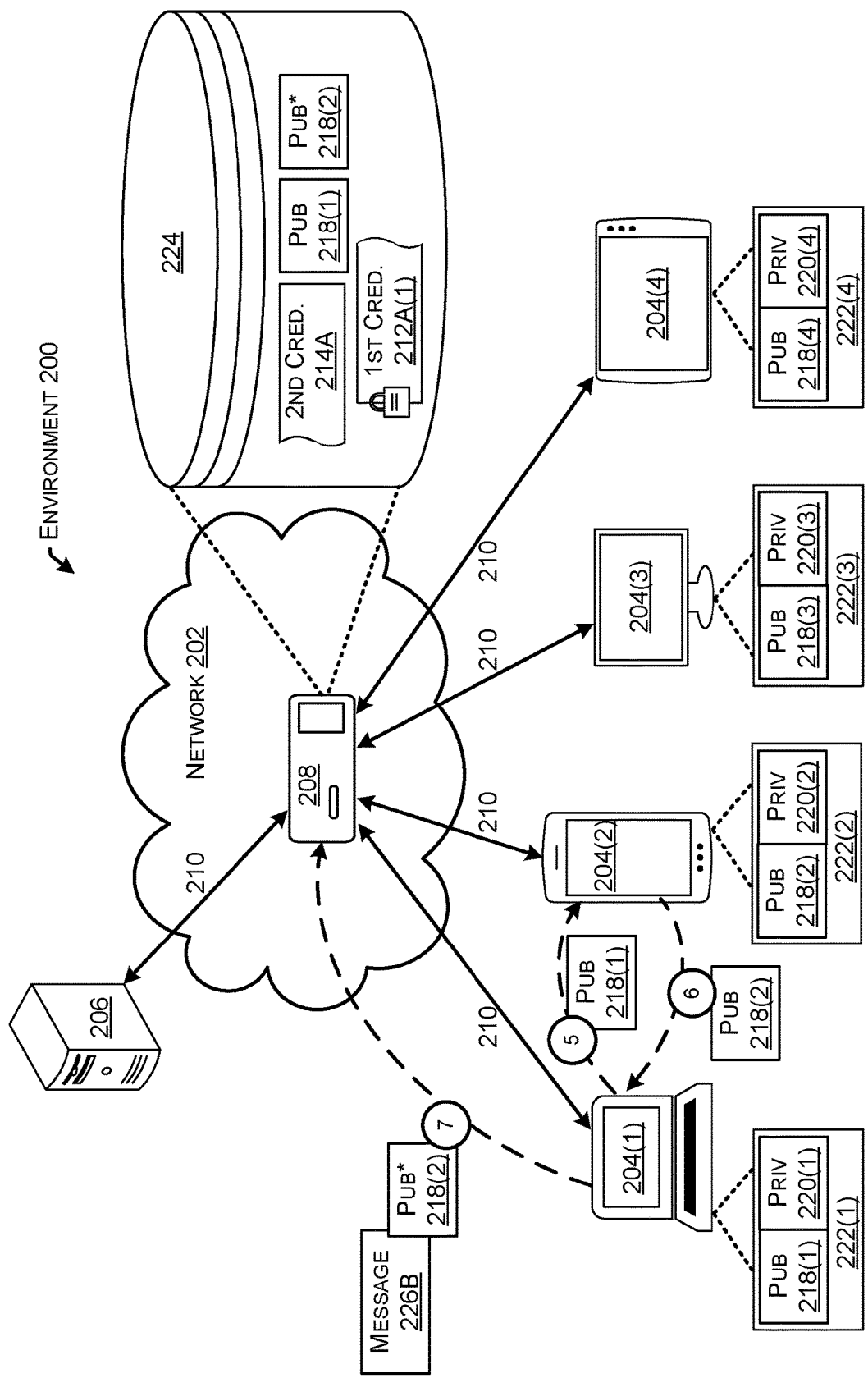

The multi-party cloud authentication scenario may continue in FIG. 2B. FIG. 2B demonstrates how additional user devices 204 may be associated with the user account at the intermediary device 208. Stated another way, FIG. 2B illustrates how a "web of trust" may be built between multiple user devices 204. At "Step 5" of FIG. 2B, user device 204(1) may send public key 218(1) to user device 204(2). Step 5 may be viewed as user device 204(1) populating an "initial trust store" of user device 204(2) with public key 218(1). Also, at "Step 6" of FIG. 2C, user device 204(2) may send public key 218(2) to user device 204(1). Since user device 204(1) and user device 204(2) are both under the control of the user, the trade of public keys 218 may be trusted. Stated another way, the user may bootstrap trust between user device 204(1) and user device 204(2) so that user device 204(2) is trusted to receive public key 218(1) from user device 204(1). Additionally or alternatively, a cloud broker or other entity may assist with the messaging that includes passing and/or trading the public keys 218 between user devices 204 of a common user. For instance, scanning a quick response (QR) code may be part of a process of passing public keys 218 between user devices 204.

At "Step 7" of FIG. 2B, user device 204(1) has received public key 218(2) of user device 204(2) and may share public key 218(2) with intermediary device 208. However, rather than simply sending public key 218(2) to intermediary device 208, user device 204(1) may sign an message 226B using private key 220(1), indicating that public key 218(2) is to be trusted in association with the user account, for instance. Intermediary device 208 may receive public key 218(2) with message 226B, and may store public key 218(2)

in storage 224. Note that in FIGS. 2B-2H, public keys 218 that have been established as associated with the user account and/or otherwise signed with a private key 220 of a user device 204 will be marked with an asterisk (*). For example, public key 218(2), for which message 226B was signed with private key 220(1), is shown in FIG. 2B as "Pub* 218(2)." Viewed another way, trust in any given user device 204 is based on the private key 220 stored at the user devices 204. Further, signatures using the private keys 220 are what allow the cloud authenticator to positively identify a user device 204. The cloud authenticator may or may not consent to use the second credential portions 214 in signing protocols if it cannot positively identify a user device 204.

Figure 2C:
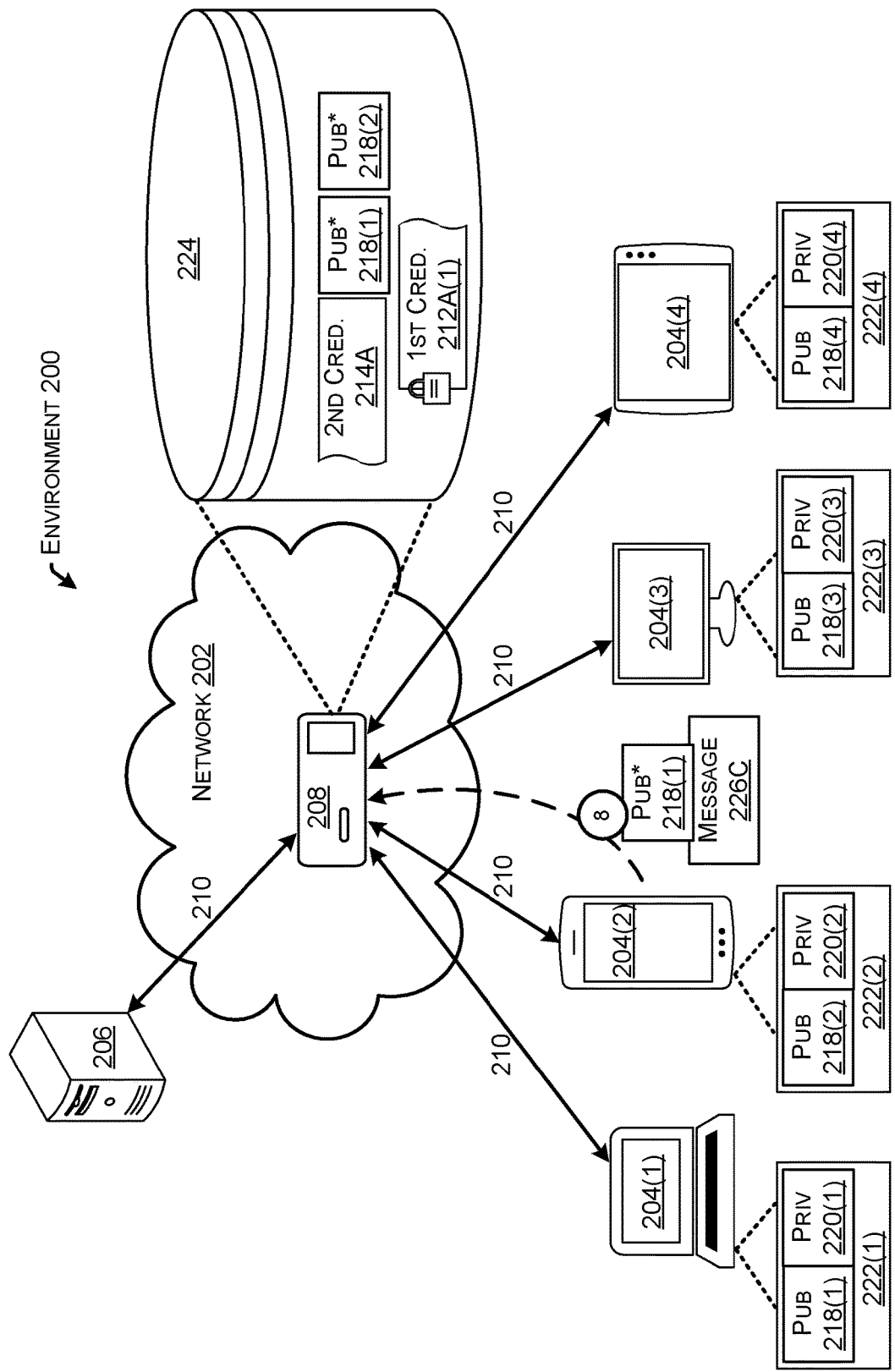

Continuing in FIG. 2C, user device 204(2) may now sign the public key of the bootstrapping device to assert reciprocal trust. For instance, at "Step 8" of FIG. 2C, user device 204(2) may sign a message 226C using private key 220(2). The message 226C may indicate to intermediary device 208 that public key 218(1) of user device 204(1) may be trusted. Therefore, storage 224 of the cloud authenticator now includes a trusted/asserted record of public key 218(1) and public key 218(2).

In some implementations, trust in newly enrolled user devices 204 is established by the previously enrolled user devices 204, not by the cloud authenticator. For example, the building of the web of trust among the user devices 204 and the intermediary device 208 is initiated by an enrolled user device 204 signing a message 226 that a new user device 204 may be trusted. In this manner, the cloud authenticator may not be able to enroll a device without the explicit consent of a device already-enrolled with that user account. Such a device of the cloud authenticator would not have been involved in the original bootstrapping of the first user device 204 to set up the user account, and therefore may not be trusted and/or approved by another user device 204 under the control of the user. Therefore, the cloud authenticator may not be able to hijack the user account, such as by enrolling its own device. Note that in some examples, a trusted third party may be permitted to enroll a "backup" device with a user account. For example, if a user loses control of their enrolled device(s), the trusted third party may be able to recover the user account. The backup device may have privileges restricted to disallow signing and/or to only allow enrolling new devices when additional requirements are met, for instance.

Figure 2D:
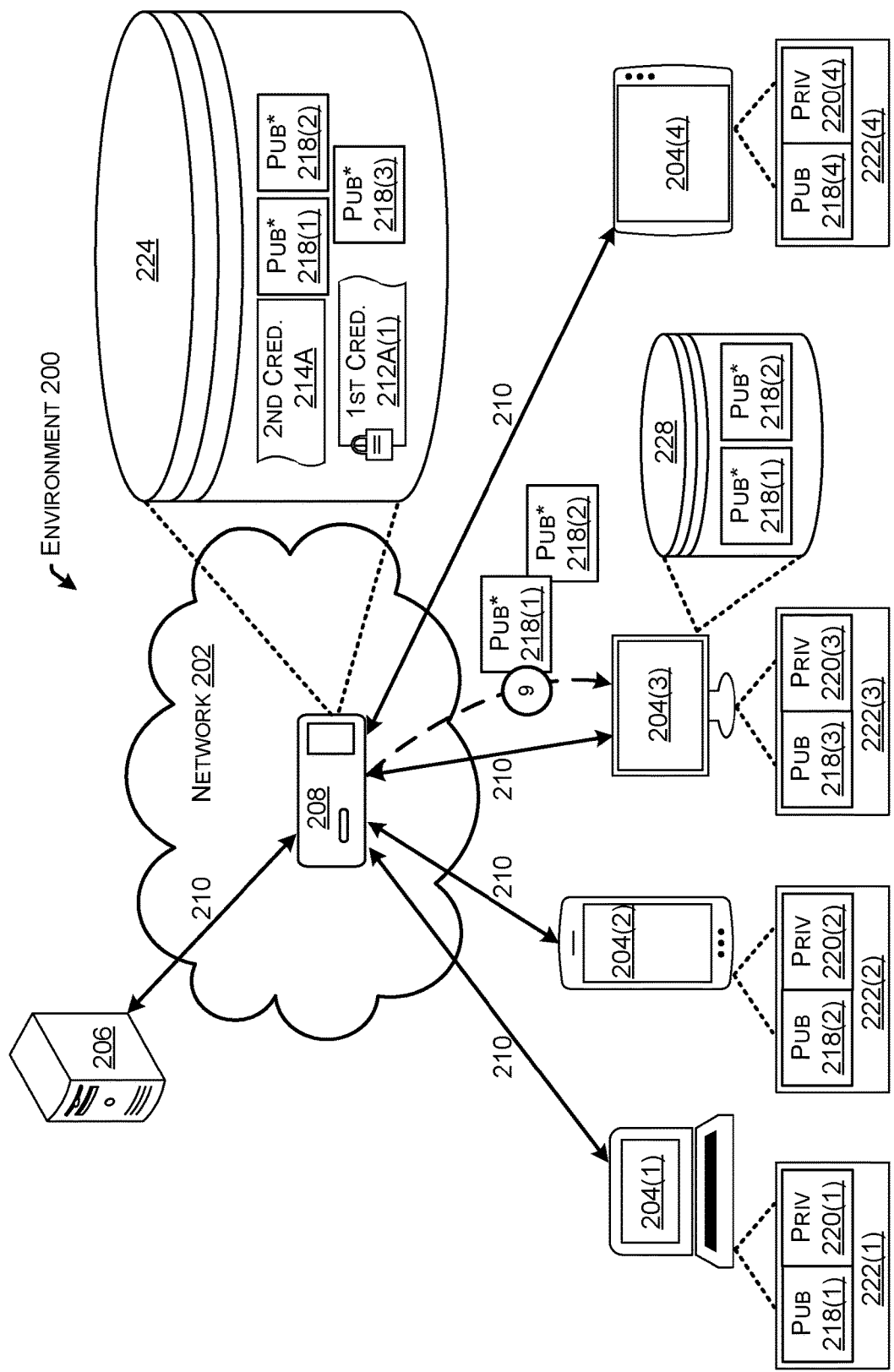

Continuing in FIG. 2D, once user devices 204 have been enrolled with the user account at the cloud authenticator, the user devices 204 may retrieve existing messages 226 and/or public keys 218 to build their own trust stores. For instance, at "Step 9" of FIG. 2D, user device 204(3) may retrieve, download, or otherwise receive previously signed/asserted public key 218(1) and public key 218(2) from intermediary device 208. The public keys 218(1) and 218(2) may be stored in storage 228 on device 204(3). In some cases, storage 228 may be viewed as a "trust store" of any given user device 204. The trust store may represent a listing of which other devices (e.g., user devices 204) a particular user device 204 may trust. Distribution of copies of the public keys 218 may be part of a synching process among user devices 204 and/or the cloud authenticator at intermediary device 208, for instance. Such a synching process may occur automatically, such as at a preset interval, and/or may occur by some other trigger, such as when user devices 204 logs in to or accesses the user account, when a new user device 204 is enrolled with the user account, etc. Population of the trust store may be viewed as a continuation of the development of the web of trust between user devices 204 and the cloud authenticator.

Figure 2E:
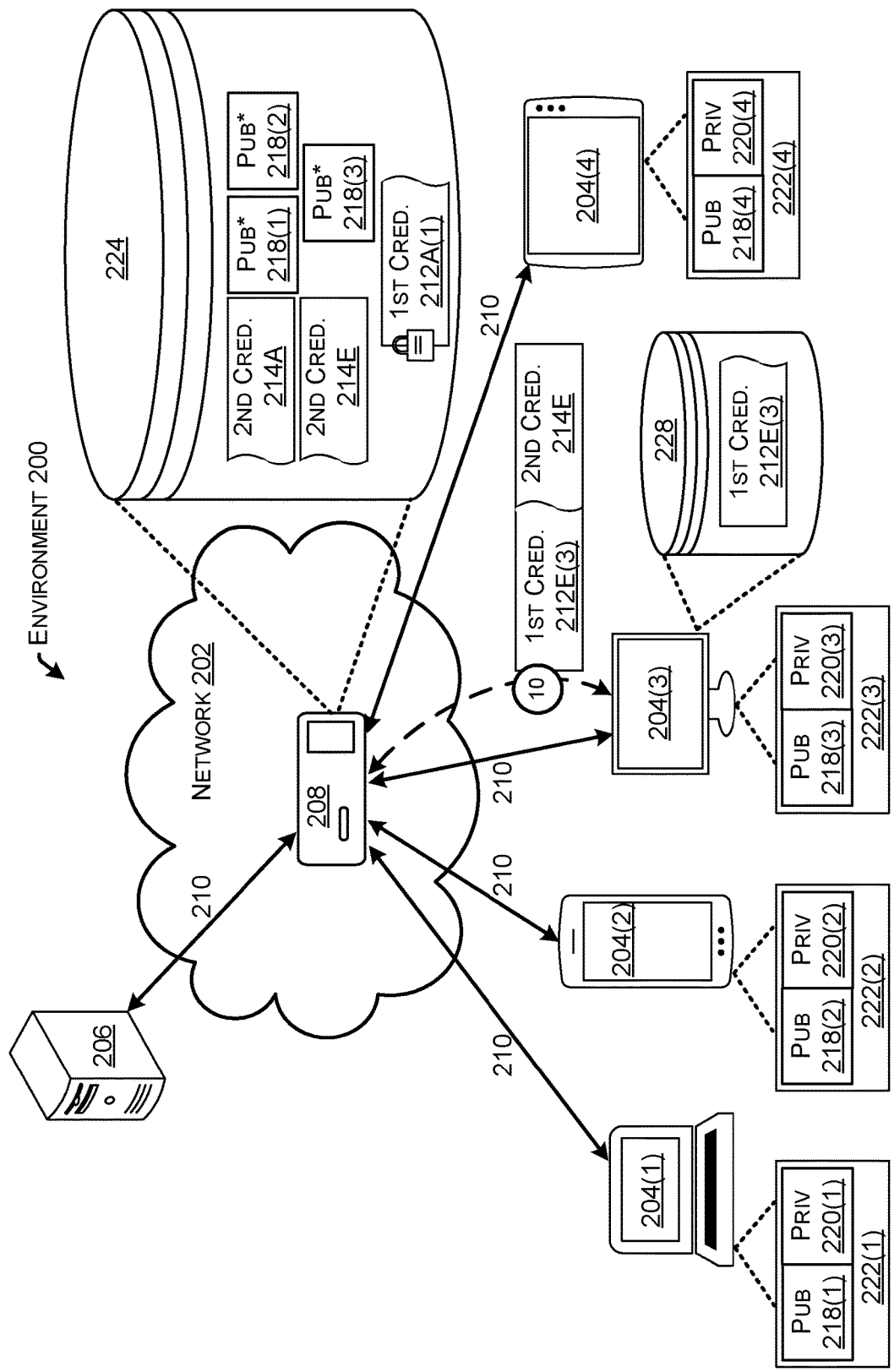

Continuing at "Step 10" of FIG. 2E, the user may wish to access another online service at server device 206 with user device 204(3), via the cloud authenticator. Step 10 may include generation of a first credential portion 212E(3) and a corresponding second credential portion 214E that may be used to authenticate the user account to the online service in this instance. Note that first credential portion 212A and first credential portion 212E may be associated with different online services (e.g., different websites), such as a website "A" and a website "E," for instance. In some examples, as shown in FIG. 2E, user device 204(3) may hold first credential portion 212E(3) in storage 228 upon generation. Also, the intermediary device 208 may hold second credential portion 214E in storage 224. The first credential portion 212E(3) and second credential portion 214E may be used in a signing protocol between user device 204(3) and intermediary device 208 for the purposes of authenticating to the online service (similar to Step 3 of FIG. 2A). Throughout any signing protocol, the first credential portion 212E(3) may be kept "secret" from the cloud authenticator.

In some implementations, copies of first credential portion 212E may be created for the purpose of sharing with other user devices 204, so that the other user devices 204 may be able to log in to the online service via the cloud authenticator without having to enroll individually and/or generate a new credential. Furthermore, in some examples, copies of first credential portion 212E may be associated with and/or signed with the public key 218 of the intended recipient user device 204. Stated another way, the copies of first credential portion 212E may be pairwise encrypted for other already-trusted user devices 204 of the user account. As such, the copies of first credential portion 212E may only be decrypted using the private key 220 of the intended recipient user device 204, which is retained in storage 222 of that user device 204. For this purpose, in "Step 11" of FIG. 2F, encrypted (designated with the lock symbol) first credential portion 212E(1) may be passed from user device 204(3) to intermediary device 208. Here, the "(1)" of first credential portion 212E(1) may indicate that this particular copy of first credential portion 212E is associated with the public key 218(1) of user device 204(1), for instance. Therefore, first credential portion 212E(1) may only be decrypted using private key 220(1), which is held by user device 204(1). Similarly, encrypted first credential portion 212E(2) may be passed from 204(3) to intermediary device 208, intended for user device 204(2). The encrypted copies may be held in storage 224 of the cloud authenticator, in association with the user account. At "Step 12," encrypted first credential portion 212E(1) may be passed to user device 204(1). Thereafter, user device 204(1) may be able to decrypt first credential portion 212E(1) using private key 220(1) and participate in a signing protocol with intermediary device 208 to access online service "E." In such an instance, intermediary device 208 would participate in the signing protocol using second credential portion 214E. Through this pairwise encryption of first credential portions 212, requiring the private keys 220 that remain in possession of individual user devices 204, the multi-party cloud authentication system is able to share the authentication credentials for different user devices 204 to access an online service, without having to separately register each user device 204 with the online service. Furthermore, the user devices 204 are trusted to receive the first credential portions 212 due to the bootstrapping of trust in the user devices 204 by the user at enrollment.

Figure 2F:
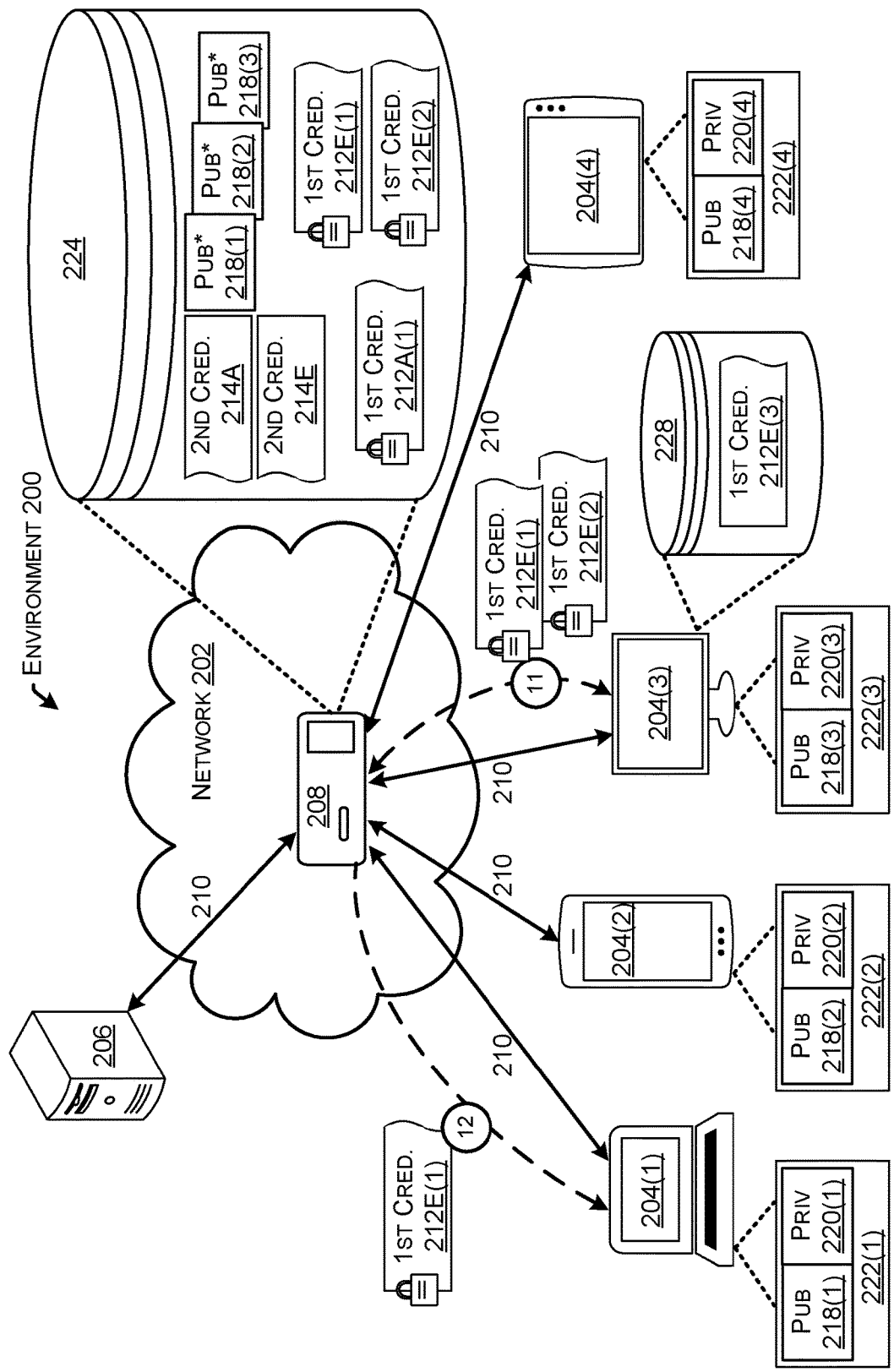

Note that in FIG. 2F, storage device 224 has acquired a collection of various items such as second credential portions 214, public keys 218, and locked first credential portions 212. Storage 224 may contain more or less items than shown in FIG. 2F at any given instance, as the information is updated and/or synchronized. For instance, at some point in time storage 224 may be updated with an encrypted copy of first credential portion 212E(3). Similarly, at some point storage 224 may be updated with encrypted copies of first credential portion 212A(1) that are associated with the public keys 218 of other user devices 204, including encrypted first credential portion 212A(2) and encrypted first credential portion 212A(3), for instance (not shown). Furthermore, items in storage 224 of the cloud authenticator and/or storage 228 at any of user devices 204 may be updated, removed, replaced, edited, moved, etc. Through updating storage 224 and/or storage 228, the overall web of trust associated with the user account may be continuously strengthened and/or improved. Additionally or alternatively, through the sharing of trust and/or encrypted first credential portions 212, the cloud authenticator may serve as backup for the user devices 204. Thus, the sharing of trust and/or encrypted first credential portions 212 fosters the multi-party cloud authentication system in which any of multiple user devices 204 may be used by the user to access an online service, without the user having to enroll each user device 204.

Figure 2G:
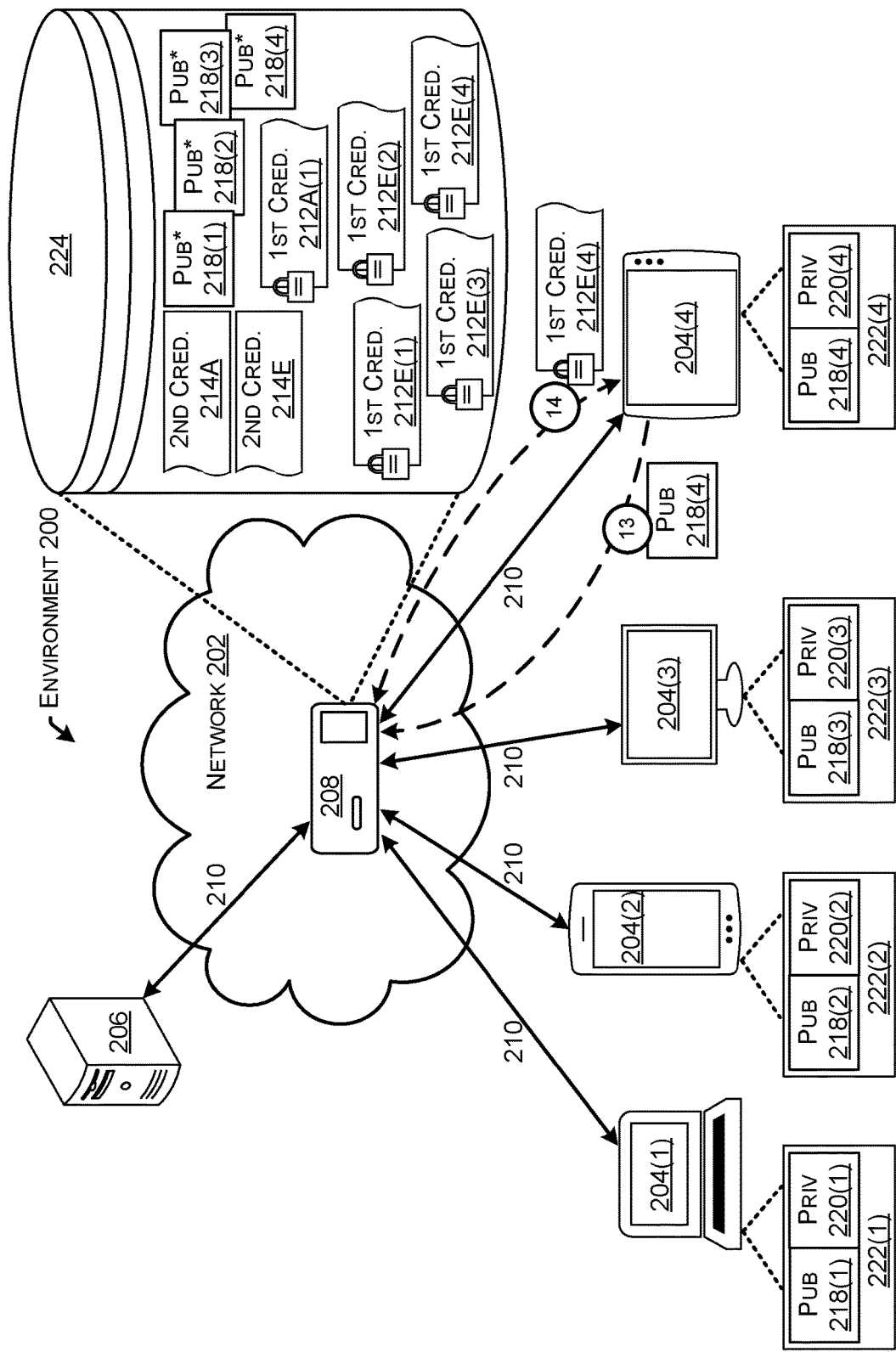

Continuing with FIG. 2G, at "Step 13," another new user device 204(4) may be enrolled, which may include providing public key 218(4) to the cloud authenticator, for instance. In some implementations, the process of enrollment of user device 204(4) may be similar to the enrollment of user device 204(2), shown in Steps 5, 6, and 7 of FIG. 2B, for example. As shown in FIG. 2G, the later-enrolled user device 204(4) may benefit from the collection of encrypted first credential portions 212, second credential portions 214, and/or public keys 218 that have been created and/or populated in the user account, such as in storage 224. At "Step 14" of FIG. 2G, encrypted first credential portion 212E(4) may be provided to user device 204(4). User device 204(4) may be able to participate in a signing protocol with intermediary device 208 to access online service "E" associated with first credential portion 212E(4). As such, user device 204(4) benefits from joining the user account at the cloud authenticator by being able to access the first credential portion 212E(4) from the previous credential generation (Step 10 in FIG. 2E), and therefore efficiently authenticate with the online service. Note that any one of the previously enrolled user devices 204 may have encrypted the new copy of first credential portion 212E(4) for user device 204(4). For instance, public key 218(4) may have been passed to user device 204(3). Then user device 204(3) may have encrypted a copy of first credential portion 212E with the public key 218(4).

FIG. 2H illustrates a scenario where a user device 204 may be disenrolled, indicated with an "X" over user device 204(2). For example, user device 204(2) may be lost, damaged, or stolen. In another example, the user may be replacing user device 204(2) with a new user device 204, and may wish to disenroll user device 204(2). For disenrollment purposes, the cloud authenticator may simply mark the disenrolled user device 204(2) as "untrusted" (indicated with an "X" over the public key 218(2) in storage 224. Intermediary device 208 may refuse to participate in a signing protocol with an untrusted device. For instance, since intermediary device 208 no longer trusts user device 204(2) in associated with the user account, intermediary device 208 will not use a second credential portion 214 to participate in a signing ceremony with user device 204(2). Since both credential portions are necessary to complete a signing protocol, even if user device 204(2) is in the possession of a different user that tries to access the user account or an online service, a corresponding first credential portion 212 on user device 204(2) would be useless to the different user. As noted above, verification that a user device 204 is in control of the intended user associated with the user account may be made with a biometric, password, etc., relative to the user device 204. Stated another way, any entity, even an attacker, may obtain a first credential portion 212 with no ill effects, such as unapproved access to a user account and/or online service.

As described through FIGS. 2A-2H, using a multi-party cloud authentication system, a first user device 204 may be used to log in to an online service, and later a second user device may be used to access that online service. For example, a user may register their mobile phone with a website, then later use their tablet to log in the website, without having to separately enroll and/or verify the tablet with the website. The sharing of an authentication credential to enable multi-party cloud authentication may be facilitated by an intermediary device and/or service, such as a cloud authenticator. Through the building of a web of trust, the user devices under control of the user are able to verify trust in other user devices. The multi-party cloud authentication system may be robust to attack after loss or theft of a device, since portions of the authentication credential are divided between the user device and the cloud authenticator. Neither the user device nor the cloud authenticator can unilaterally complete and use the complete authentication credential without cooperation from the other entity.

In some implementations, a multi-party cloud authentication system may be applied to an enterprise case, where a cloud authenticator account may be created not for a user, but for a "role" in the enterprise. An administrator may create a role account and then enroll all or a subset of one or more user devices in that account. The benefits of the multi-party cloud authentication system may be similarly realized in the enterprise case, including sharing an authentication credential (portion), disenrolling user devices from a role account, etc. For instance, in some examples, the administrator may be able to use the multi-party cloud authentication system to apply policy to user devices, and then may block release of a credential where a particular user device does not conform to the policy.

To summarize, the multi-party cloud authentication techniques described herein may represent a more efficient and safer method of authenticating users to an online service. The techniques may therefore improve security relative to cloud computing services, while also improving the user experience. The techniques may be relatively lightweight, featuring low computational cost and/or low bandwidth usage. Furthermore, the benefits of multi-party cloud authentication techniques may be become more pronounced as users increasingly use multiple devices to access online services, and do not wish to be hassled with cumbersome log on processes.

Figure 3:
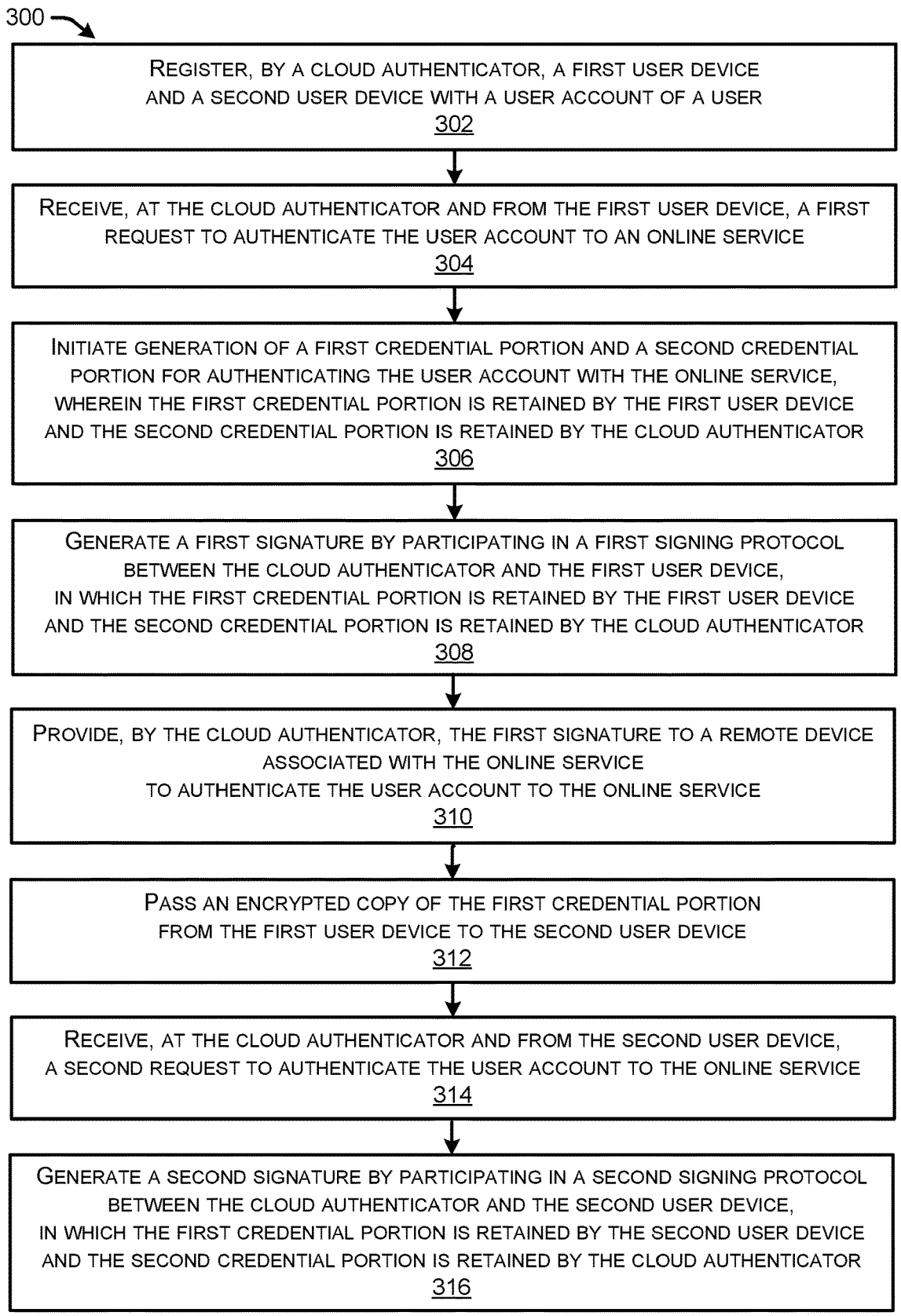
FIGS. 3-4 illustrate flow diagrams of example methods for multi-party cloud authentication concepts, in accordance with the present concepts.
Figure 4:
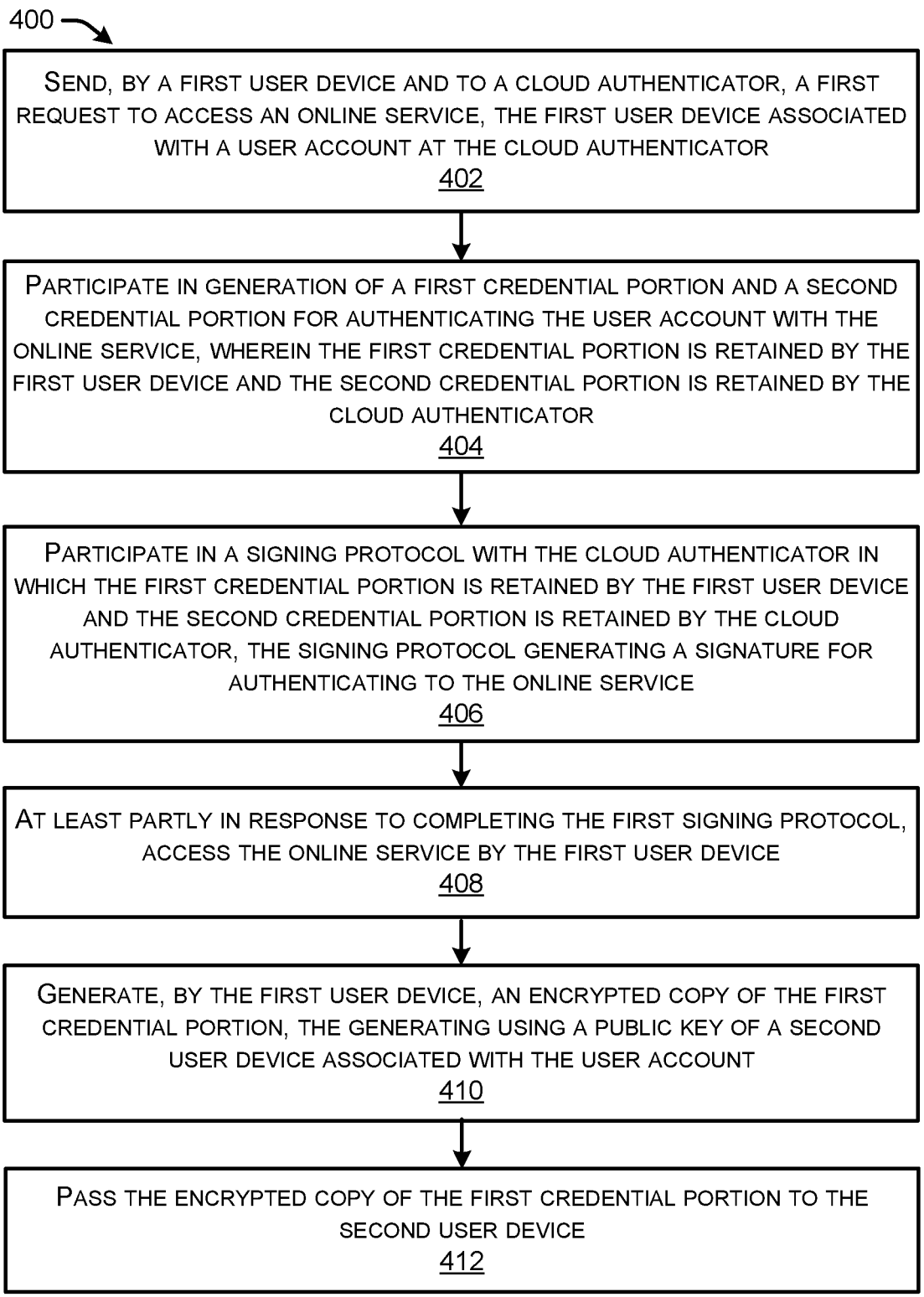

FIGS. 3 and 4 illustrate flow diagrams of example methods 300 and 400 that include functions that may be performed at least partly by a network device, such as intermediary devices 108 or 208, or a user device, such as user devices 104 or 204 described relative to FIGS. 1A-2H. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for network devices to perform multi-party cloud authentication techniques. Method 300 may be performed by an intermediary device (e.g., intermediary device 108 or 208) communicatively coupled to first and second user devices (e.g., user devices 104 or 204), for instance. The intermediary device may represent a cloud authenticator. The intermediary device may also be communicatively coupled to a server device. The server device may represent an online service, such as a website. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include registering, by the cloud authenticator, a first user device and a second user device with a user account of a user.

At 304, method 300 may include receiving, at the cloud authenticator and from the first user device, a first request to authenticate the user account to the online service.

At 306, method 300 may include initiating generation of a first credential portion and a second credential portion for authenticating the user account with the online service. In some examples, the first credential portion may be retained by the first user device. Further, the second credential portion is retained by the cloud authenticator. The first credential portion and the second credential portion may be retained by the first user device and the cloud authenticator, respectively, throughout the generation process. In this manner, neither the first user device nor the cloud authenticator may have possession of the credential portion belonging to the other entity.

At 308, method 300 may include generating a first signature by participating in a first signing protocol between the cloud authenticator and the first user device. During the signing protocol, the first credential portion may be retained by the first user device and the second credential portion may be retained by the cloud authenticator. Here again, neither the first user device nor the cloud authenticator may have possession of the credential portion belonging to the other entity during and/or throughout the signing protocol. In some examples, the signing protocol may be a threshold signature signing protocol.

At 310, method 300 may include providing, by the cloud authenticator, the first signature to a remote device associated with the online service to authenticate the user account to the online service. Providing the first signature may include the cloud authenticator sending the first signature to the online service. Stated another way, the cloud authenticator may log in to the online service on behalf of the user, using the first signature. In other examples, providing the first signature may include the cloud authenticator facilitating the first user device sending the first signature to the online service. For instance, the cloud authenticator may participate in the signing protocol, from which the first user device may receive the first signature and log in directly to the online service using the first signature.

At 312, method 300 may include passing an encrypted copy of the first credential portion from the first user device to the second user device. In some examples, the encrypted copy of the first credential portion may be encrypted at least in part using a public key of the second user device. For instance, the encrypted copy of the first credential portion may be encrypted by a symmetric key that is encrypted by the public key of the second user device. The encrypted symmetric key may also be included in a message that contains the encrypted copy of the first credential portion. In some examples, method 300 may include the first user device receiving the public key of the second user device. The public key of the second user device may be received by the first user device upon enrollment of the second user device with the user account, for example. The public key of the second user device may be associated with a private key held by the second user device. Therefore, the second user device may be able to decrypt the encrypted copy of the first credential portion using the private key.

At 314, method 300 may include receiving, at the cloud authenticator and from the second user device, a second request to authenticate the user account to the online service. In some examples, in response to receiving the second request from the second user device, the cloud authenticator may verify that the second user device is a trusted device with the user account. Verifying that the second user device is a trusted device may include referencing a public key of the second user device by the cloud authenticator, for instance.

At 316, method 300 may include generating a second signature by participating in a second signing protocol between the cloud authenticator and the second user device. The cloud authenticator may participate in the second signing protocol based at least in part on verifying that the second user device is a trusted device with the user account. Once again, the first credential portion may be retained by the second user device and the second credential portion may be retained by the cloud authenticator. In some implementations, the first user device and the second user device may (potentially) never have access to plain text of the second credential portion. Further, the cloud authenticator may (potentially) never have access to plain text of the first credential portion. Neither entity requires knowledge of the credential portion belonging to the other entity to be able to perform multi-party cloud authentication techniques.

FIG. 4 illustrates a flow diagram of an example method 400 for network devices to perform loop prevention techniques. Method 300 may be performed by a first user device (e.g., user device 104 or 204) communicatively coupled to an intermediary device (e.g., intermediary device 108 or 208) and/or a second user device, for instance. The intermediary device may represent a cloud authenticator. The intermediary device and/or the user devices may also be communicatively coupled to a server device. The server device may represent an online service, such as a website. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include sending, by the first user device and to the cloud authenticator, a first request to access the online service. The first user device may be associated with a user account at the cloud authenticator, for example.

At 404, method 400 may include participating in generation of a first credential portion and a second credential portion for authenticating the user account with the online service. In some examples, the first credential portion may be retained by the first user device and the second credential portion may be retained by the cloud authenticator.

At 406, method 400 may include participating in a signing protocol with the cloud authenticator. During the signing protocol, the first credential portion may be retained by the first user device and the second credential portion may be retained by the cloud authenticator. The signing protocol may generate a signature for authenticating to the online service, for instance. In some examples, the signing protocol may comprises a threshold signature signing protocol and/or the signature comprises a threshold signature.

At 408, at least partly in response to completing the signing protocol, method 400 may include accessing the online service by the first user device. The first user device may access the online service directly, or may access the online service indirectly via the cloud authenticator, for instance.

At 410, method 400 may include generating, by the first user device, an encrypted copy of the first credential portion. The encryption may be performed using a public key of a second user device associated with the user account. For instance, method 400 may include receiving, by the first user device, the public key of the second user device. Receiving the public key of the second user device may indicate and/or may be in response to enrollment of the second user device with the user account at the cloud authenticator. In some examples, the user devices and the cloud authenticator may participate in an exchange of public keys and/or encrypted first credential portions. The exchange may be related to updating the user account, backing up elements of the user account and/or the trust stores at the user devices, and/or any type of account synchronization process.

At 412, method 400 may include passing the encrypted copy of the first credential portion to the second user device. Passing the encrypted copy of the first credential portion to the second user device may comprise passing the encrypted copy directly to the second user device. Alternatively, passing the encrypted copy of the first credential portion to the second user device may comprise passing the encrypted copy indirectly to the second user device via the cloud authenticator.

Figure 5:
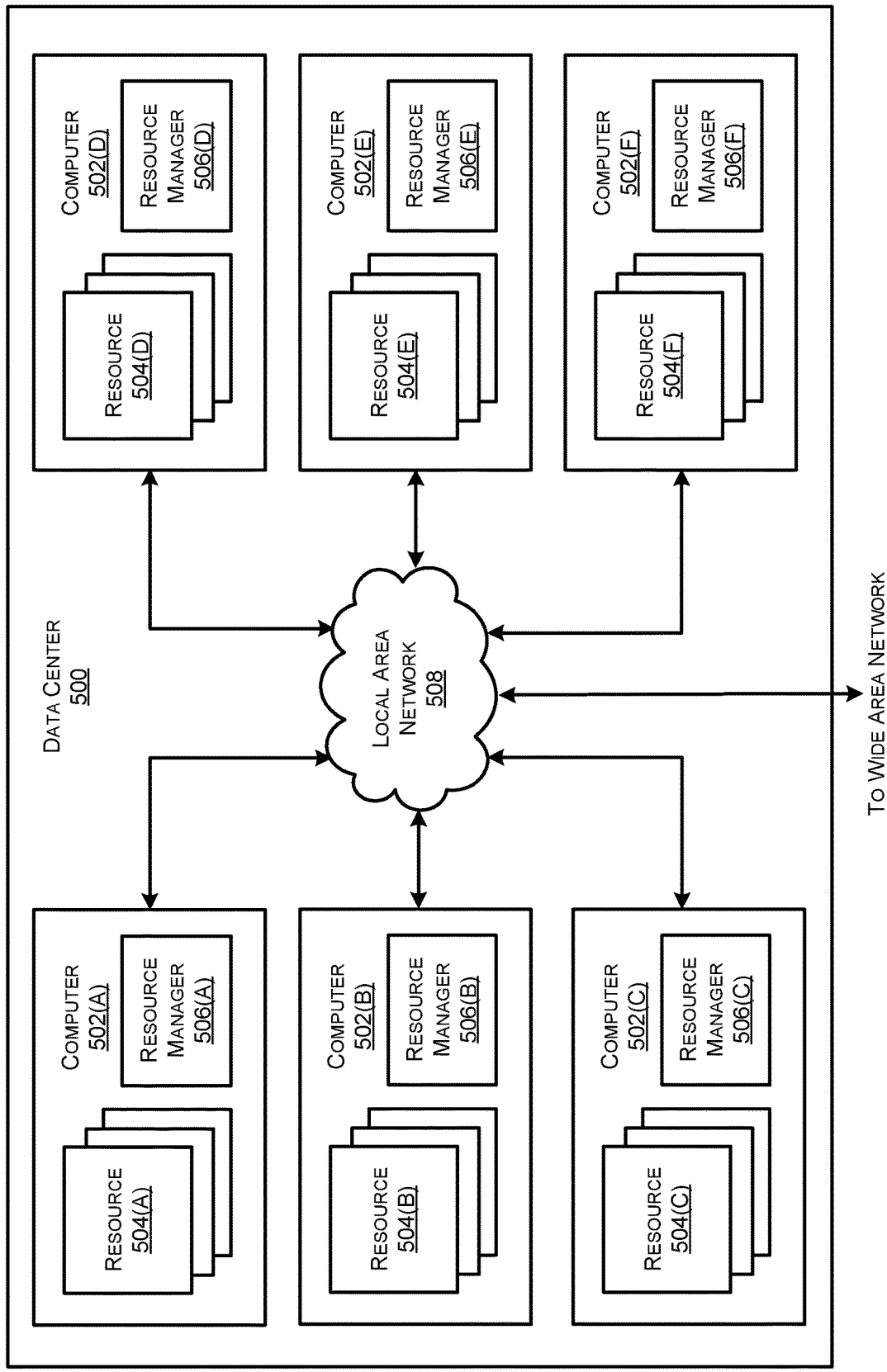
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as an intermediary device (108 or 208) and/or a user device (104 or 204). Although, computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in the cloud computing network 102 or 202.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regards to FIG. 6.

Figure 6:
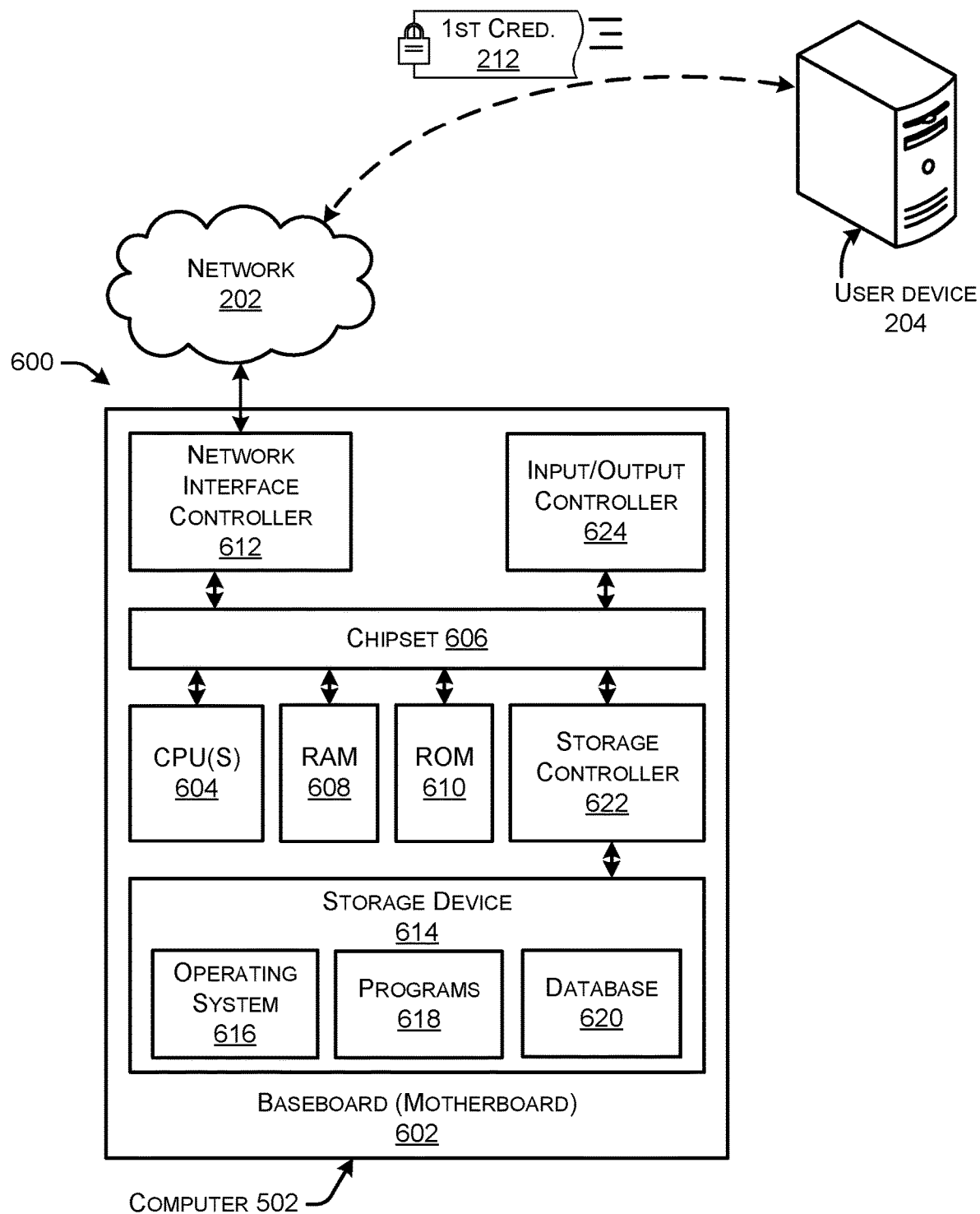
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., intermediary device, user device, etc.), and may comprise networked devices such as servers, switches, routers, hubs, bridges, gateways, modems, repeaters, access points, etc. For instance, computer 502 may correspond to intermediary device 108 or 208.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as networks 102, 202, and/or 508. The chipset 606 can include functionality for providing network connectivity through a network interface controller (NIC) 612, such as a gigabit Ethernet adapter. The NIC 612 is capable of connecting the computer 502 to other computing devices over the network 202. For instance, in the example shown in FIG. 6, NIC 612 may help facilitate transfer of data, packets, messages, assertions, signatures and/or communications, such as encrypted first credential portions 212 and/or public keys 218, over the network 202 with intermediary device 208. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, database 620, and/or other data. In some examples, database 620 may represent and/or include storage 222, 224, and/or 228, for instance. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by the network (e.g., 102, 202, and/or 508), and or any components included therein, may be supported by one or more devices similar to computer 502. Stated otherwise, some or all of the operations performed by the network (e.g., 102, 202, and/or 508), and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regards to FIGS. 1A-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as intermediary device 108 or 208, user devices 104 or 204, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by intermediary device 108 or 208, user devices 104 or 204, and/or other devices. In some examples, the communications may include data, packet, message, assertion, signature and/or other communications, such as encrypted first credential portions 212 and/or public keys 218, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with multi-party cloud authentication techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques for multi-party cloud authentication.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:

registering, by a cloud authenticator, a first user device and a second user device with a user account of a user;

receiving, at the cloud authenticator and from the first user device, a first request to authenticate the user account to an online service;

initiating generation of a first credential portion and a second credential portion for authenticating the user account with the online service, wherein the first credential portion is retained by the first user device and the second credential portion is retained by the cloud authenticator;

generating a first signature by participating in a first signing protocol between the cloud authenticator and the first user device, in which the first credential portion is retained by the first user device and the second credential portion is retained by the cloud authenticator;

providing, by the cloud authenticator, the first signature to a remote device associated with the online service to authenticate the user account to the online service;

passing an encrypted copy of the first credential portion from the first user device to the second user device;

receiving, at the cloud authenticator and from the second user device, a second request to authenticate the user account to the online service; and generating a second signature by participating in a second signing protocol between the cloud authenticator and the second user device, in which the first credential portion is retained by the second user device and the second credential portion is retained by the cloud authenticator.

2. The computer-implemented method of claim 1, wherein the cloud authenticator does not have access to plain text of the first credential portion during generation of the first signature and during the first signing protocol and during the second signing protocol.

3. The computer-implemented method of claim 1, wherein the cloud authenticator does not have access to plain text of the first credential portion during the first signing protocol and during the second signing protocol.

4. The computer-implemented method of claim 1, wherein the first signing protocol is a threshold signature signing protocol.

5. The computer-implemented method of claim 1, wherein the encrypted copy of the first credential portion is encrypted at least in part using a public key of the second user device.

6. The computer-implemented method of claim 1, further comprising:
  in response to receiving the second request from the second user device, verifying that the second user device is a trusted device; and
  participating in the second signing protocol based at least in part on verifying that the second user device is a trusted device.

7. The computer-implemented method of claim 6, wherein verifying that the second user device is a trusted device includes referencing a public key of the second user device by the cloud authenticator.

8. The computer-implemented method of claim 7, wherein the public key of the second user device is associated with a private key held by the second user device, and the public key is used to encrypt the encrypted copy of the first credential portion.

9. A cloud computing device comprising:
  one or more processors; and
  one or more non-transitory computer-readable media storing computer-executable instructions that, when executed by the one or more processors, cause the one or more processors to:
  register a first user device and a second user device with a user account of a user;
  receive, from the first user device, a first request to authenticate the user account to an online service;
  initiate generation of a first credential portion and a second credential portion for authenticating the user account with the online service, wherein the first credential portion is retained by the first user device;
  generate a first signature by participating in a first signing protocol with the first user device, in which the first credential portion is retained by the first user device;
  provide the first signature to a remote device associated with the online service to authenticate the user account to the online service;
  pass an encrypted copy of the first credential portion from the first user device to the second user device;
  receive, from the second user device, a second request to authenticate the user account to the online service; and
  generate a second signature by participating in a second signing protocol with the second user device, in which the first credential portion is retained by the second user device.

10. The cloud computing device of claim 9, wherein the cloud computing device does not have access to plain text of the first credential portion during generation of the first signature and during the first signing protocol and during the second signing protocol.

11. The cloud computing device of claim 9, wherein the cloud computing device does not have access to plain text of the first credential portion during the first signing protocol and during the second signing protocol.

12. The cloud computing device of claim 9, wherein the first signing protocol is a threshold signature signing protocol.

13. The cloud computing device of claim 9, wherein the encrypted copy of the first credential portion is encrypted using a public key of the second user device.

14. The cloud computing device of claim 9, wherein the computer-executable instructions further cause the one or more processors to:
  in response to receiving the second request from the second user device, verify that the second user device is a trusted device; and
  participate in the second signing protocol based at least in part on verifying that the second user device is a trusted device.

15. The cloud computing device of claim 14, wherein verifying that the second user device is a trusted device includes referencing a public key of the second user device.

16. The cloud computing device of claim 15, wherein the public key of the second user device is associated with a private key held by the second user device, and the public key is used to encrypt the encrypted copy of the first credential portion.

17. A method comprising:
  sending, by a first user device and to a cloud authenticator, a first request to access an online service, the first user device associated with a user account at the cloud authenticator;
  participating in generation of a first credential portion and a second credential portion for authenticating the user account with the online service, wherein the first credential portion is retained by the first user device and the second credential portion is retained by the cloud authenticator;
  participating in a signing protocol with the cloud authenticator in which the first credential portion is retained by the first user device and the second credential portion is retained by the cloud authenticator, the signing protocol generating a signature for authenticating to the online service;
  at least partly in response to completing the signing protocol, accessing the online service by the first user device;
  generating, by the first user device, an encrypted copy of the first credential portion, the generating using a public key of a second user device associated with the user account; and
  passing the encrypted copy of the first credential portion to the second user device.

18. The method of claim 17, wherein the signing protocol comprises a threshold signature signing protocol, and the signature comprises a threshold signature.

19. The method of claim 17, further comprising:
receiving, by the first user device, the public key of the second user device indicating enrollment of the second user device with the user account at the cloud authenticator.

20. The method of claim 19, wherein the passing the encrypted copy of the first credential portion to the second user device comprises passing the encrypted copy indirectly to the second user device via the cloud authenticator.

\* \* \* \* \*